(12) United States Patent
Dutta et al.

(10) Patent No.: US 11,737,163 B2
(45) Date of Patent: Aug. 22, 2023

(54) SIDELINK DISCONTINUOUS TRANSMISSION (DTX) CONFIGURATION

(71) Applicant: QUALCOMM Incorporated, San Diego, CA (US)

(72) Inventors: Sourjya Dutta, San Diego, CA (US); Shuanshuan Wu, San Diego, CA (US); Kapil Gulati, Belle Mead, NJ (US); Sudhir Kumar Baghel, Hillsborough, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 129 days.

(21) Appl. No.: 17/203,344

(22) Filed: Mar. 16, 2021

(65) Prior Publication Data

US 2021/0315045 A1    Oct. 7, 2021

Related U.S. Application Data

(60) Provisional application No. 63/003,783, filed on Apr. 1, 2020.

(51) Int. Cl.
*H04W 76/28* (2018.01)
*H04W 76/14* (2018.01)
*H04B 7/06* (2006.01)
*H04B 7/08* (2006.01)

(52) U.S. Cl.
CPC .................................. *H04W 76/28* (2018.02)

(58) Field of Classification Search
CPC .... H04W 76/28; H04W 76/14; H04B 7/0695; H04B 7/088
USPC .......................................................... 370/329
See application file for complete search history.

(56) References Cited

U.S. PATENT DOCUMENTS

| | | | |
|---|---|---|---|
| 2010/0215027 A1* | 8/2010 | Liu ..................... | H04B 7/0408 370/338 |
| 2019/0215888 A1* | 7/2019 | Cirik ..................... | H04W 76/19 |
| 2019/0245603 A1* | 8/2019 | Yum ................... | H04W 72/042 |
| 2019/0349960 A1* | 11/2019 | Li ..................... | H04L 27/26136 |
| 2020/0028745 A1* | 1/2020 | Parkvall ................ | H04W 24/10 |
| 2020/0128436 A1* | 4/2020 | Chae .................. | H04W 72/1284 |

\* cited by examiner

*Primary Examiner* — Inder P Mehra
(74) *Attorney, Agent, or Firm* — Patterson + Sheridan LLP

(57) ABSTRACT

Certain aspects of the present disclosure provide techniques for configuring sidelink communications between user equipment's (UEs). Per one technique, during a discovery opportunity, a first UE and a second UE may identify a subset of beam pairs suitable for communication, and schedule a discontinuous transmission (DTX) occasion during the discovery opportunity. During the DTX occasion, the first UE and second UE may perform a beam refinement procedure to determine a beam pair (BP) over which to communicate, from the identified subset of beam pairs. The beam refinement procedure may include beam narrowing of at least one of the identified subset of beam pairs.

29 Claims, 15 Drawing Sheets

SIDELINK DISCONTINUOUS TRANSMISSION (DTX) CONFIGURATION

CROSS-REFERENCE TO RELATED APPLICATION

This application claims benefit of and priority to U.S. Provisional Patent Application No. 63/003,783, filed Apr. 1, 2020, which is hereby incorporated by reference in its entirety.

BACKGROUND

Field of the Disclosure

Aspects of the present disclosure relate to wireless communications, and more particularly, to techniques for beam configuration and selection for sidelink communications between two user equipments (UEs).

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more BSs may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or a DU may communicate with a set of UEs on downlink (DL) channels (e.g., for transmissions from a BS or a DU to a UE) and uplink (UL) channels (e.g., for transmissions from a UE to a BS or a DU).

These multiple access technologies have been adopted in various telecommunication standards to provide a common protocol that enables different wireless devices to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the DL and on the UL. To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved and desirable techniques for beam configuration and selection for sidelink communications between user equipments (UEs) in a wireless network.

Certain aspects provide a method for wireless communications by a first UE. The method generally includes identifying, during a discovery opportunity, a plurality of transmit beams for sidelink communications with a second UE, and performing, in conjunction with a discontinuous transmission (DTX) occasion of the first UE, a beam refinement procedure with the second UE, wherein the beam refinement procedure involves sending reference signals using a set of transmit beams that are a subset of or differ from the transmit beams identified during the discovery opportunity.

Certain aspects provide a method for wireless communications by a first UE. The method generally includes identifying, during a discovery opportunity, a plurality of receive beams for sidelink communications with a second UE, and performing, in conjunction with a DTX occasion of the second UE, a beam refinement procedure with the second UE, wherein the beam refinement procedure involves sending reference signals using a set of receive beams that are a subset of or differ from the receive beams identified during the discovery opportunity.

Certain aspects provide an apparatus for wireless communications. The apparatus generally includes means for identifying, during a discovery opportunity, a plurality of transmit beams for sidelink communications with a second UE; and means for performing, in conjunction with a DTX occasion of the first UE, a beam refinement procedure with the second UE, wherein the beam refinement procedure involves sending reference signals using transmit beams that are a subset of or differ from the transmit beams identified during the discovery opportunity.

Certain aspects provide an apparatus for wireless communications. The apparatus generally includes means for identifying, during a discovery opportunity, a plurality of receive beams for sidelink communications with a second UE; and means for performing, in conjunction with a DTX occasion of the second UE, a beam refinement procedure with the second UE, wherein the beam refinement procedure involves receiving reference signals using receive beams that are a subset of or differ from the receive beams identified during the discovery opportunity.

Certain aspects provide an apparatus for wireless communications. The apparatus generally includes at least one processor and a memory configured to identify, during a discovery opportunity, a plurality of transmit beams for sidelink communications with a second UE; and perform, in conjunction with a DTX occasion of the first UE, a beam refinement procedure with the second UE, wherein the beam refinement procedure involves sending reference signals using transmit beams that are a subset of or differ from the transmit beams identified during the discovery opportunity.

Certain aspects provide an apparatus for wireless communications. The apparatus generally includes at least one processor and a memory configured to identify, during a discovery opportunity, a plurality of receive beams for sidelink communications with a second UE; and perform, in conjunction with a DTX occasion of the second UE, a beam refinement procedure with the second UE, wherein the beam refinement procedure involves receiving reference signals using receive beams that are a subset of or differ from the receive beams identified during the discovery opportunity.

Certain aspects of the subject matter described in this disclosure can be implemented in a computer readable medium storing computer executable code thereon for wireless communications. The computer readable medium comprises code for identifying, by a first UE during a discovery opportunity, a plurality of transmit beams for sidelink communications with a second UE; and code for performing, in conjunction with a DTX occasion of the first UE, a beam refinement procedure with the second UE, wherein the beam refinement procedure involves sending reference signals using transmit beams that are a subset of or differ from the transmit beams identified during the discovery opportunity.

Certain aspects of the subject matter described in this disclosure can be implemented in a computer readable medium storing computer executable code thereon for wireless communications. The computer readable medium comprises code for identifying, by a first UE during a discovery opportunity, a plurality of receive beams for sidelink communications with a second UE; and code for performing, in conjunction with a DTX occasion of the second UE, a beam refinement procedure with the second UE, wherein the beam refinement procedure involves receiving reference signals using receive beams that are a subset of or differ from the receive beams identified during the discovery opportunity.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
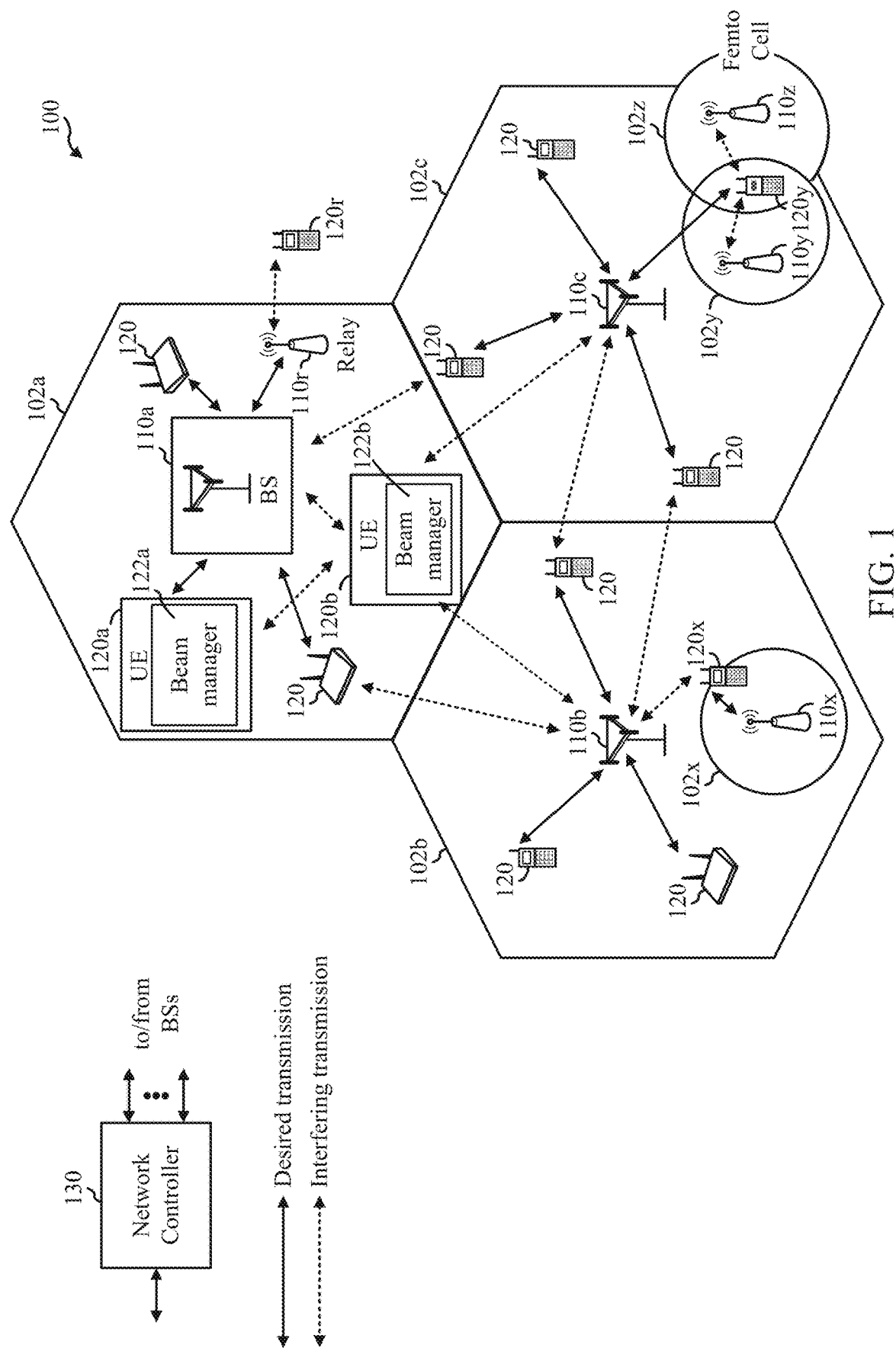
FIG. 1 is a block diagram conceptually illustrating an example telecommunications system, in accordance with certain aspects of the present disclosure.

Aspects of the present disclosure provide apparatus, methods, processing systems, and computer readable mediums for configuring sidelink communications at frequency range 2 (FR2). During a discovery opportunity, a first user equipment (UE) and a second UE may identify a subset of beam pairs suitable for communication, and schedule a discontinuous transmission (DTX) occasion during the discovery opportunity. During the DTX occasion, the first UE and second UE may perform a beam refinement procedure to determine a beam pair (BP) over which to communicate, from the identified subset of beam pairs. The beam refinement procedure may include beam narrowing of at least one of the identified subset of beam pairs.

The following description provides example techniques for beam configuration and selection for sidelink communications between UEs, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless communication technologies, such as long term evolution (LTE), code division multiple access (CDMA), time division multiple access (TDMA), frequency division multiple access (FDMA), orthogonal frequency division multiple access (OFDMA), single-carrier frequency division multiple access (SC-FDMA) and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as new radio (NR) (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

NR is an emerging wireless communications technology under development in conjunction with the 5G Technology Forum (5GTF). 3GPP LTE and LTE-Advanced (LTE-A) are releases of the UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

NR access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

NR supports beamforming and beam direction may be dynamically configured. Multiple input multiple output (MIMO) transmissions with precoding may also be supported. MIMO configurations in a downlink (DL) may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

Example Wireless Communications System

FIG. 1 illustrates an example wireless communication network 100 in which aspects of the present disclosure may be performed. For example, the wireless communication network 100 may include one or more base stations (BSs) 110 and/or one or more user equipments (UEs) 120, such as UE 120*a* (such as a transmitter UE) that includes a beam manager 122*a* that may be configured to perform beam refinement for sidelink communications during discontinuous transmission (DTX) occasions, in accordance with operations 900 of FIG. 9. As shown in FIG. 1, a UE 120*b* (such as a receiver UE) includes a beam manager 122*b* that may be configured to perform beam refinement for sidelink communications during DTX occasions, in accordance with operations 1000 of FIG. 10.

The wireless communication network 100 may be a new radio (NR) system (e.g., a 5th generation (5G) NR network). As shown in FIG. 1, the wireless communication network 100 may be in communication with a core network. The core network may in communication with one or more BSs 110a-z (each also individually referred to herein as a BS 110 or collectively as BSs 110) and/or UEs 120a-y (each also individually referred to herein as a UE 120 or collectively as UEs 120) in the wireless communication network 100 via one or more interfaces.

As illustrated in FIG. 1, the wireless communication network 100 may include a number of BSs 110 and other network entities. A BS 110 may be a station that communicates with UEs 120. Each BS 110 may provide communication coverage for a particular geographic area. In 3 GPP, the term "cell" can refer to a coverage area of a Node B (NB) and/or a NB subsystem serving this coverage area, depending on the context in which the term is used. In NR systems, the term "cell" and next generation NodeB (gNB or gNodeB), NR BS, 5G NB, access point (AP), or transmission reception point (TRP) may be interchangeable. In some examples, a cell may not necessarily be stationary, and the geographic area of the cell may move according to the location of a mobile BS 110. In some examples, the BSs 110 may be interconnected to one another and/or to one or more other BSs 110 or network nodes (not shown) in wireless communication network 100 through various types of backhaul interfaces, such as a direct physical connection, a wireless connection, a virtual network, or the like using any suitable transport network.

A BS 110 may provide communication coverage for a macro cell, a pico cell, a femto cell, and/or other types of cells. A macro cell may cover a relatively large geographic area (e.g., several kilometers in radius) and may allow unrestricted access by UEs 120 with service subscription. A pico cell may cover a relatively small geographic area and may allow unrestricted access by UEs 120 with service subscription. A femto cell may cover a relatively small geographic area (e.g., a home) and may allow restricted access by UEs 120 having an association with the femto cell (e.g., UEs 120 in a Closed Subscriber Group (CSG), UEs 120 for users in the home, etc.). A BS 110 for a macro cell may be referred to as a macro BS. A BS 110 for a pico cell may be referred to as a pico BS. A BS 110 for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS 110 may support one or multiple (e.g., three) cells.

The wireless communication network 100 may also include relay stations. A relay station is a station that receives a transmission of data and/or other information from an upstream station (e.g., a BS 110 or a UE 120) and sends a transmission of the data and/or other information to a downstream station (e.g., a UE 120 or a BS 110). A relay station may also be a UE 120 that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless communication network 100 may be a heterogeneous network that includes BSs 110 of different types, e.g., macro BS, pico BS, femto BS, relays, etc. These different types of BSs 110 may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

The wireless communication network 100 may support synchronous or asynchronous operation. For synchronous operation, the BSs 110 may have similar frame timing, and transmissions from different BSs 110 may be approximately aligned in time. For asynchronous operation, the BSs 110 may have different frame timing, and transmissions from different BSs 110 may not be aligned in time. The techniques described herein may be used for both synchronous and asynchronous operation.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE 120 may be stationary or mobile. A UE 120 may also be referred to as a mobile station, a terminal, an access terminal, a subscriber unit, a station, a customer premises equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs 120 may be considered machine-type communication (MTC) devices or evolved MTC (eMTC) devices. MTC and eMTC UEs include, for example, robots, drones, remote devices, sensors, meters, monitors, location tags, etc., that may communicate with a BS 110, another device (e.g., remote device), or some other entity. A wireless node may provide, for example, connectivity for or to a network (e.g., a wide area network such as Internet or a cellular network) via a wired or wireless communication link. Some UEs 120 may be considered Internet-of-Things (IoT) devices, which may be narrowband IoT (NB-IoT) devices.

Certain wireless networks (e.g., LTE) utilize orthogonal frequency division multiplexing (OFDM) on a downlink (DL) and single-carrier frequency division multiplexing (SC-FDM) on an uplink (UL). OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the UL and the DL and include support for half-duplex operation using TDD. Beamforming may be supported and beam direction may be dynamically configured. Multiple input multiple output (MIMO) transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., a BS 110) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. The BSs 110 are not the only entities that may function as a scheduling entity. In some examples, a UE 120 may function as a scheduling entity and may schedule resources for one or more subordinate entities (e.g., one or more other UEs 120), and the other UEs 120 may utilize the resources scheduled by the UE 120 for wireless communication. In some examples, a UE 120 may function as a scheduling entity in a peer-to-peer (P2P) network, and/or in a mesh network. In a mesh network example, UEs 120 may communicate directly with one another in addition to communicating with a scheduling entity.

In FIG. 1, a solid line with double arrows indicates desired transmissions between a UE 120 and a serving BS 110, which is a BS 110 designated to serve the UE 120 on the DL and/or UL. A finely dashed line with double arrows indicates interfering transmissions between a UE 120 and a BS 110.

Figure 2:
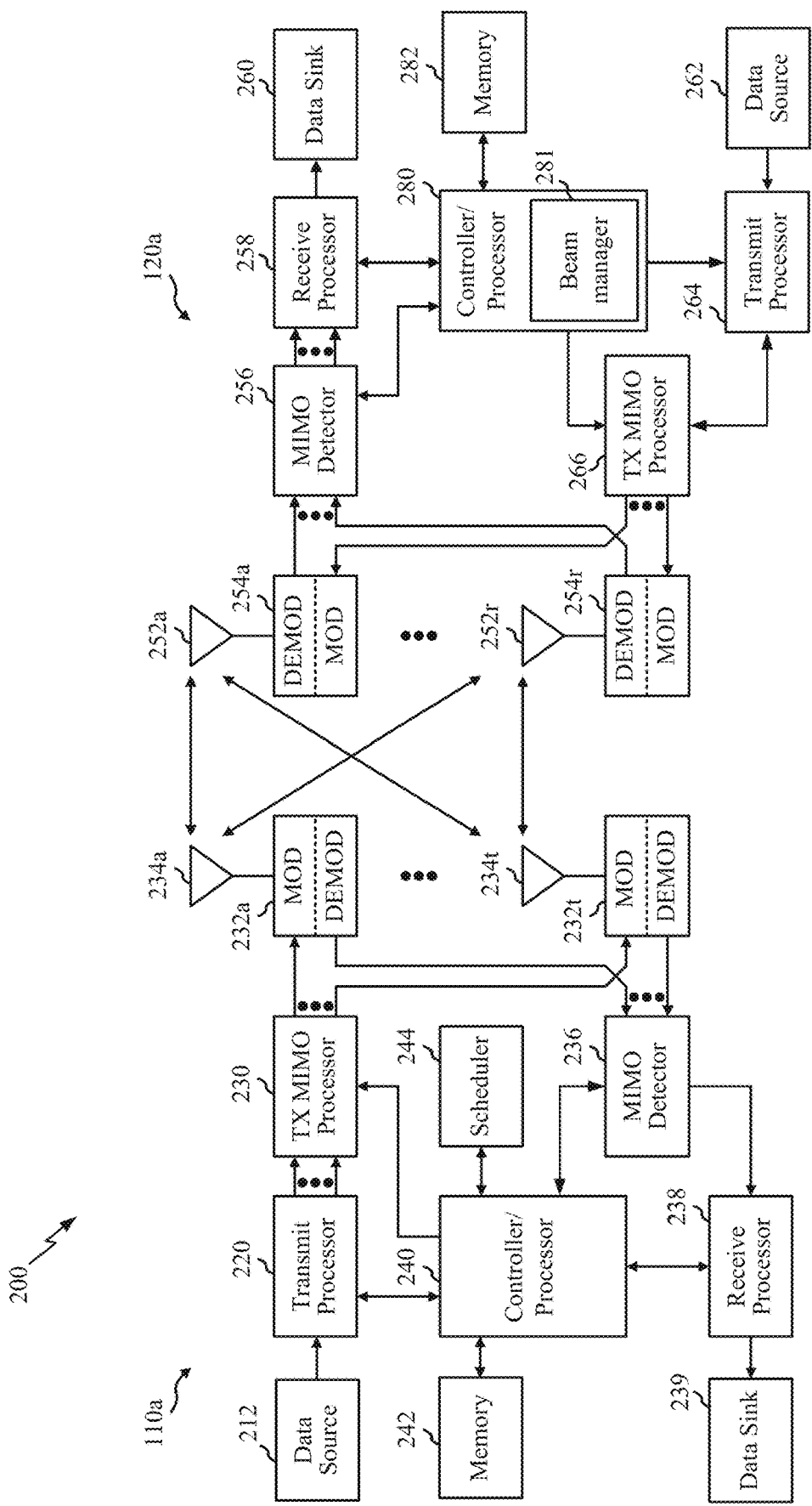
FIG. 2 is a block diagram conceptually illustrating a design of an example base station (BS) and user equipment (UE), in accordance with certain aspects of the present disclosure.

FIG. 2 illustrates example components of a BS 110*a* and a UE 120*a* (e.g., in the wireless communication network 100 of FIG. 1).

At the BS 110*a*, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The transmit processor 220 may process (for example, encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit MIMO processor 230 may perform spatial processing (for example, precoding) on the data symbols, the control symbols, or the reference symbols, if applicable, and may provide output symbol streams to modulators (MODs) in transceivers 232*a*-232*t*. Each modulator in transceivers 232 may process a respective output symbol stream (for example, for OFDM, etc.) to obtain an output sample stream. Each MOD in transceivers 232 may further process (for example, convert to analog, amplify, filter, and upconvert) the output sample stream to obtain a DL signal. The DL signals from the MODs in transceivers 232*a*-232*t* may be transmitted via antennas 234*a*-234*t*, respectively.

At the UE 120*a*, antennas 252*a*-252*r* may receive DL signals from the BS 110 and may provide received signals to the demodulators (DEMODs) in transceivers 254*a*-254*r*, respectively. Each DEMOD in the transceiver 254 may condition (for example, filter, amplify, downconvert, and digitize) a respective received signal to obtain input samples. Each DEMOD in the transceiver 254 may further process the input samples (for example, for OFDM, etc.) to obtain received symbols. A MIMO detector 256 may obtain received symbols from all the demodulators 254*a*-254*r*, perform MIMO detection on the received symbols if applicable, and provide detected symbols. A receive processor 258 may process (for example, demodulate, deinterleave, and decode) the detected symbols, provide decoded data for the UE 120 to a data sink 260, and provide decoded control information to a controller/processor 280.

On the UL, at UE 120*a*, a transmit processor 264 may receive and process data (for example, for the physical uplink shared channel (PUSCH)) from a data source 262 and control information (for example, for the physical uplink control channel (PUCCH) from the controller/processor 280. The transmit processor 264 may also generate reference symbols for a reference signal (for example, for the sounding reference signal (SRS)). The symbols from the transmit processor 264 may be precoded by a transmit MIMO processor 266 if applicable, further processed by the DEMODs in transceivers 254*a*-254*r* (for example, for SC-FDM, etc.), and transmitted to the BS 110. At the BS 110, the UL signals from the UE 120 may be received by the antennas 234, processed by the MOD in transceivers 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The memories 242 and 282 may store data and program codes for the BSa 110 and the UE 120*a*, respectively. A scheduler 244 may schedule UEs for data transmission on the DL or UL.

Antennas 252, processors 266, 258, 264, and/or controller/processor 280 of the UE 120*a* and/or antennas 234, processors 220, 230, 238, and/or controller/processor 240 of the BS 110*a* may be used to perform various techniques and methods described herein. For example, as shown in FIG. 2, the controller/processor 280 of the UE 120*a* has a beam manager 281 that may be configured to perform the operations illustrated in FIG. 9, as well as other operations disclosed herein, in accordance with aspects of the present disclosure. Although shown at the controller/processor, other components of the UE 120a may be used performing the operations described herein.

Figure 3:
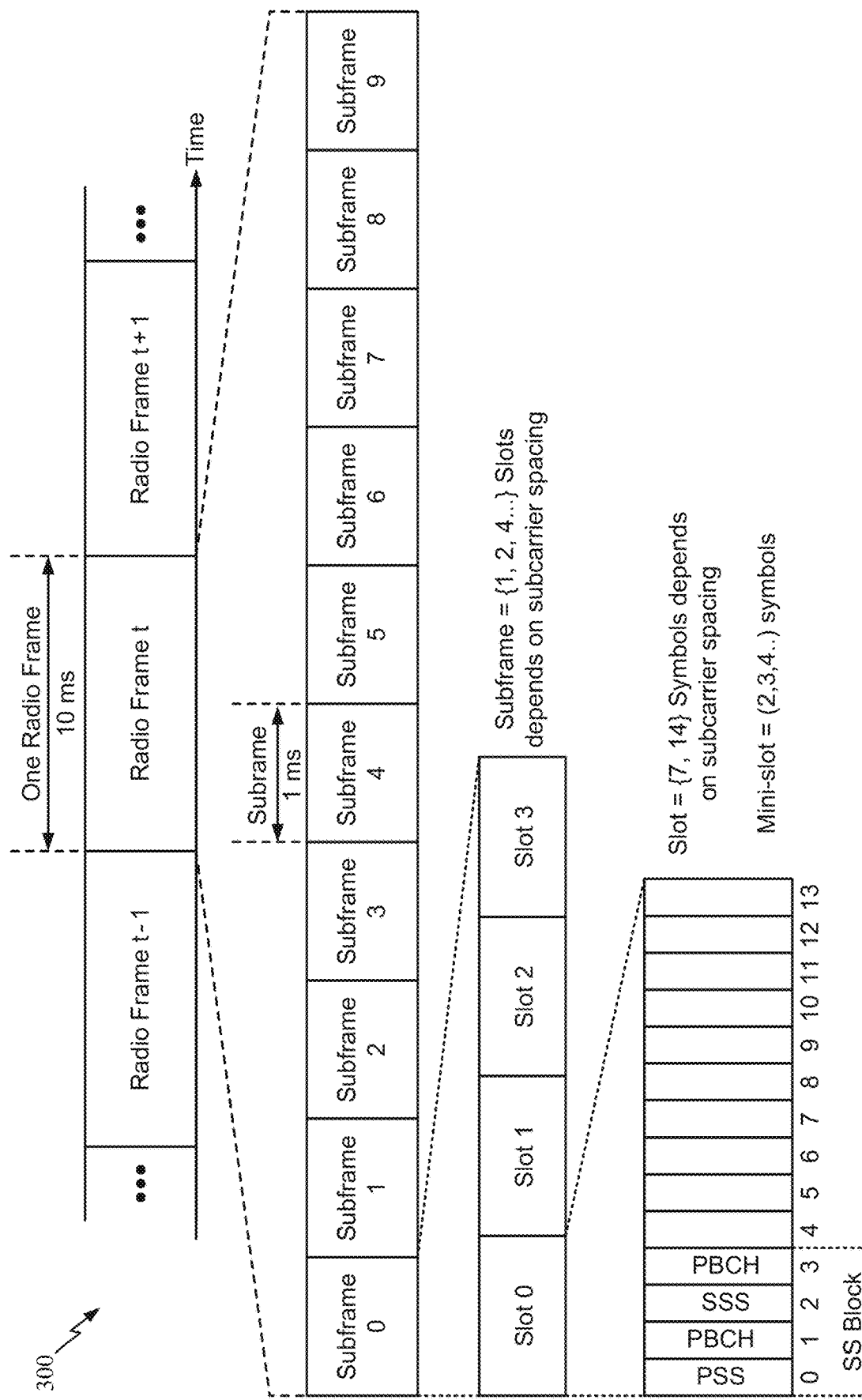
FIG. 3 illustrates an example of a frame format for a telecommunication system, in accordance with certain aspects of the present disclosure

FIG. 3 is a diagram showing an example of a frame format 300 for NR. The transmission timeline for each of the DL and UL may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as DL system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a PDSCH in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

Example Beam Management Procedures

Figure 4:
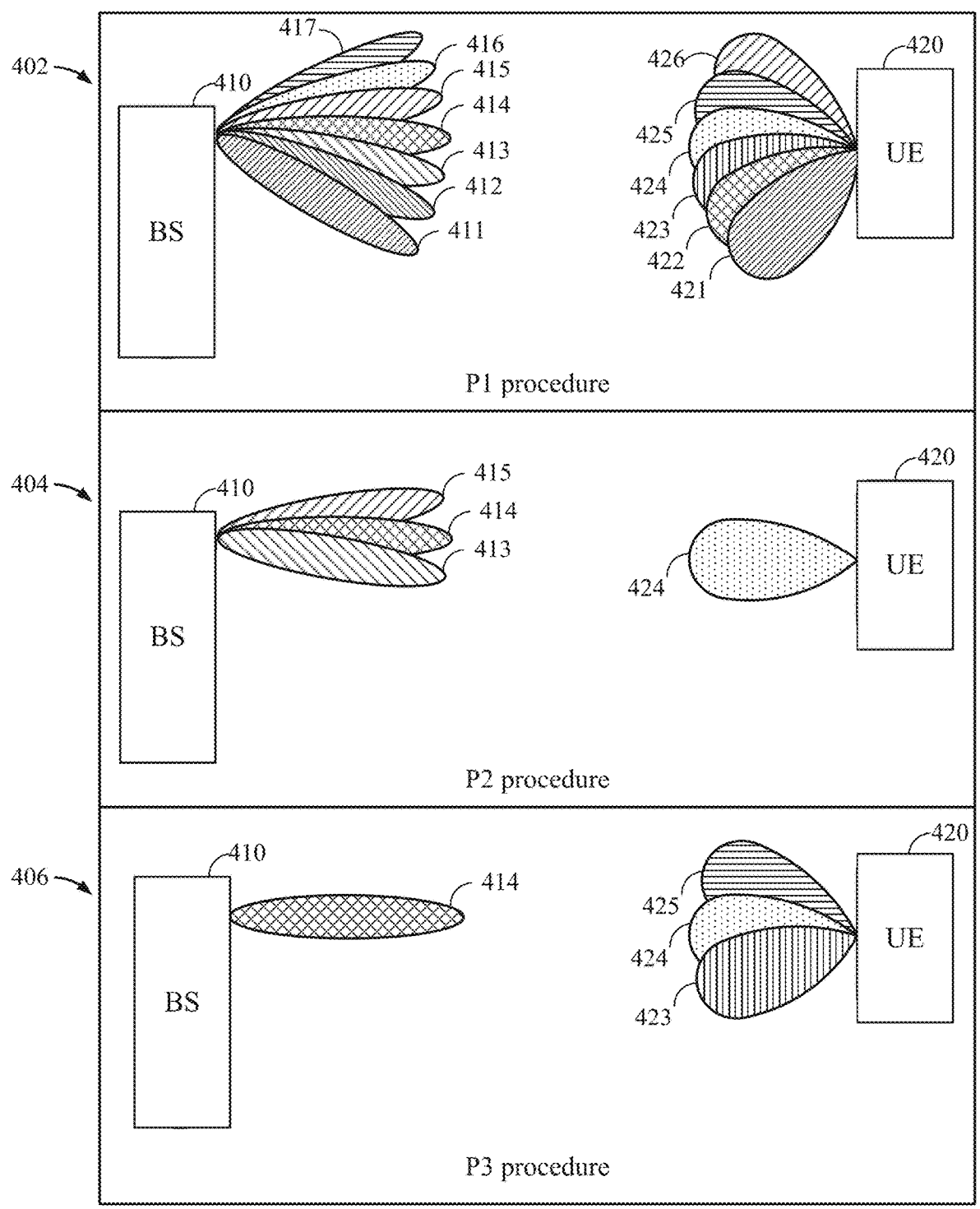
FIG. 4 illustrates example beam management procedures, in accordance with certain aspects of the present disclosure.

In 5G new radio (NR), a beam management procedure for determining of beam pair links (BPLs) may be referred to as a P1 procedure. FIG. 4 illustrates an example P1 procedure 402. A base station (BS) 410 (e.g., such as the BS 110a in the wireless communication network 100) may send a measurement request to a user equipment (UE) 420 (e.g., such as the UE 120a in the wireless communication network 100) and may subsequently transmit one or more signals (sometimes referred to as the "P1-signal") to the UE 420 for measurement. In the P1 procedure 402, the BS 410 transmits the signal with beam forming in a different spatial direction (corresponding to a transmit beam 411, 412, . . . , 417) in each symbol, such that several (e.g., most or all) relevant spatial locations of the cell of the BS 410 are reached. In this manner, the BS 410 transmits the signal using different transmit beams over time in different directions. In some examples, a synchronization signal block (SSB) is used as the P1-signal. In some examples, channel state information reference signal (CSI-RS), demodulation reference signal (DMRS), or another downlink (DL) signal can be used as the P1-signal.

In the P1 procedure 402, to successfully receive at least a symbol of the P1-signal, the UE 420 finds (e.g., determines/selects) an appropriate receive beam (421, 422, . . . , 426). Signals (e.g., SSBs) from multiple BSs can be measured simultaneously for a given signal index (e.g., SSB index) corresponding to a given time period. The UE 420 can apply a different receive beam during each occurrence (e.g., each symbol) of the P1-signal. Once the UE 420 succeeds in receiving a symbol of the P1-signal, the UE 420 and BS 410 have discovered a BPL (i.e., a UE receive (RX) beam used to receive the P1-signal in the symbol and a BS transmit (TX) beam used to transmit the P1-signal in the symbol). In some cases, the UE 420 does not search all of its possible UE RX beams until it finds best UE RX beam, since this causes additional delay. Instead, the UE 420 may select a RX beam once the RX beam is "good enough", for example, having a quality (e.g., signal to noise ratio (SNR) or signal to interference and noise ratio (SINR)) that satisfies a threshold (e.g., predefined threshold). The UE 420 may not know which beam the BS 410 used to transmit the P1-signal in a symbol; however, the UE 420 may report to the BS 410 the time at which it observed the signal. For example, the UE 420 may report the symbol index in which the P1-signal was successfully received to the BS 410. The BS 410 may receive this report and determine which BS TX beam the BS 410 used at the indicated time. In some examples, the UE 420 measures signal quality of the P1-signal, such as reference signal receive power (RSRP) or another signal quality parameter (e.g., SNR, channel flatness, etc.). The UE 420 may report the measured signal quality (e.g., RSRP) to the BS 410 together with the symbol index. In some cases, the UE 420 may report multiple symbol indices to the BS 410, corresponding to multiple BS TX beams.

As a part of a beam management procedure, the BPL used between a UE 420 and a BS 410 may be refined/changed. For example, the BPL may be refined periodically to adapt to changing channel conditions, for example, due to movement of the UE 420 or other objects, fading due to Doppler spread, etc. The UE 420 can monitor the quality of a BPL (e.g., a BPL found/selected during the P1 procedure and/or a previously refined BPL) to refine the BPL when the quality drops (e.g., when the BPL quality drops below a threshold or when another BPL has a higher quality). In 5G NR, the beam management procedures for beam refinement of BPLs may be referred to as the P2 and P3 procedures to refine the BS-beam and UE-beam, respectively, of an individual BPL.

FIG. 4 further illustrates an example P2 procedure 404 and P3 procedure 406. As shown in FIG. 4, for the P2 procedure 404, the BS 410 transmits symbols of a signal with different BS-beams (e.g., TX beams 415, 414, 413) that are spatially close to the BS-beam of the current BPL. For example, the BS 410 transmits the signal in different symbols using neighboring TX beams (e.g., beam sweeps) around the TX beam of the current BPL. As shown in FIG. 4, the TX beams used by the BS 410 for the P2 procedure 404 may be different from the TX beams used by the BS 410 for the P1 procedure 402. For example, the TX beams used by the BS 410 for the P2 procedure 404 may be spaced closer together and/or may be more focused (e.g., narrower) than the TX beams used by the BS 410 for the P1 procedure. During the P2 procedure 404, the UE 420 keeps its RX beam (e.g., RX beam 424) constant. The UE 420 may measure the signal quality (e.g., RSRP) of the signal in the different symbols and indicate the symbol in which the highest signal quality was measured. Based on the indication, the BS 410 can determine the strongest (e.g., best, or associated with the highest signal quality) TX beam (i.e., the TX beam used in the indicated symbol). The BPL can be refined accordingly to use the indicated TX beam.

As shown in FIG. 4, for the P3 procedure 406, the BS 420 maintains a constant TX beam (e.g., the TX beam of the current BPL) and transmits symbols of a signal using the constant TX beam (e.g., TX beam 414). During the P3 procedure 406, the UE 420 scans the signal using different RX beams (e.g., RX beams 423, 424, 425) in different symbols. For example, the UE 420 may perform a sweep using neighboring RX beams to the RX beam in the current BPL (i.e., the BPL being refined). The UE 420 may measure the signal quality (e.g., RSRP) of the signal for each RX beam and identify the strongest UE RX beam. The UE 420 may use the identified RX beam for the BPL. The UE 420 may report the signal quality to the BS 410.

Example Sidelink Scenarios

In some circumstances, two or more subordinate entities (e.g., user equipments (UEs)) may communicate with each other using sidelink signals. Real-world applications of such sidelink communications may include public safety, proximity services, UE-to-network relaying, vehicle-to-vehicle (V2V) communications, internet of things (IoE) communications, internet of things (IoT) communications, mission-critical mesh, and/or various other suitable applications. Generally, a sidelink signal may refer to a signal communicated from one subordinate entity (e.g., a UE1) to another subordinate entity (e.g., a UE2) without relaying that communication through a scheduling entity (e.g., a UE or a base station (BS)), even though the scheduling entity may be utilized for scheduling and/or control purposes. In some examples, the sidelink signals may be communicated using a licensed spectrum (unlike wireless local area networks, which typically use an unlicensed spectrum).

Figures 5A, 5B:
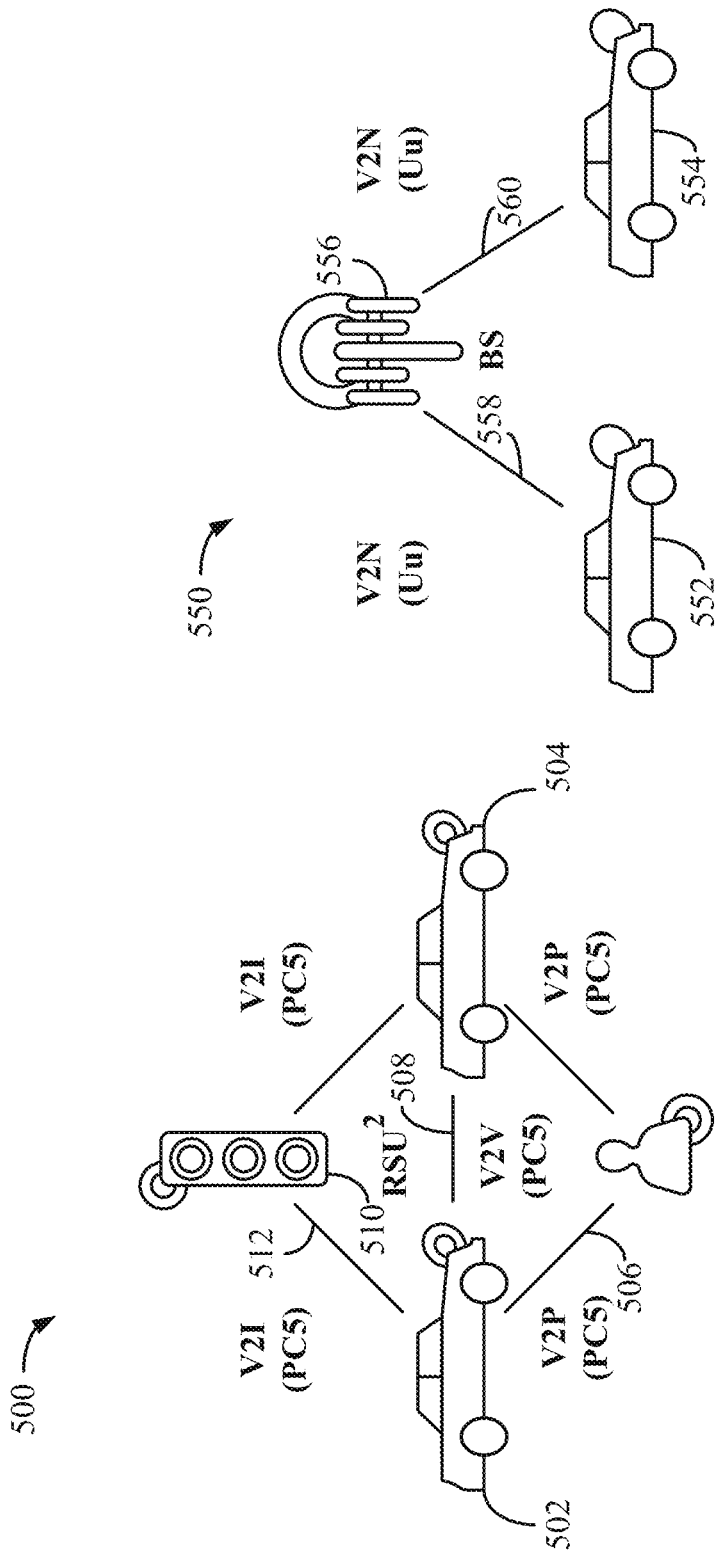
FIGS. 5A and 5B show diagrammatic representations of example vehicle to everything (V2X) systems in accordance with some aspects of the present disclosure.

FIGS. 5A and 5B show diagrammatic representations of example vehicle to everything (V2X) systems. For example, UEs such as vehicles shown in these V2X systems may communicate via sidelink channels and may perform sidelink channel state information (CSI) reporting.

The V2X systems, provided in FIGS. 5A and 5B provide two complementary transmission modes. A first transmission mode, shown by way of example in FIG. 5A, involves direct communications (for example, also referred to as sidelink communications) between participants in proximity to one another in a local area. A second transmission mode, shown by way of example in FIG. 5B, involves network communications through a network, which may be implemented over a Uu interface (for example, a wireless communication interface between a radio access network (RAN) and a UE).

Referring to FIG. 5A, a V2X system 500 (for example, including vehicle to vehicle (V2V) communications) is illustrated with two vehicles 502, 504. The first transmission mode allows for direct communication between different participants in a given geographic location. As illustrated, a vehicle can have a wireless communication link 506 with an individual (V2P) (for example, via a UE) through a PC5 interface. Communications between the vehicles 502 and 504 may also occur through a PC5 interface 508. In a like manner, communication may occur from a vehicle 502 to other highway components (for example, highway component 510), such as a traffic signal or sign (V2I) through a PC5 interface 512. With respect to each communication link illustrated in FIG. 5A, two-way communication may take place between elements, therefore each element may be a transmitter and a receiver of information. The V2X system 500 may be a self-managed system implemented without assistance from a network entity. A self-managed system may enable improved spectral efficiency, reduced cost, and increased reliability as network service interruptions do not occur during handover operations for moving vehicles. The V2X system may be configured to operate in a licensed or unlicensed spectrum, thus any vehicle with an equipped system may access a common frequency and share information. Such harmonized/common spectrum operations allow for safe and reliable operation.

FIG. 5B shows a V2X system 550 for communication between a vehicle 552 and a vehicle 554 through a network entity 556. These network communications may occur through discrete nodes, such as a BS (for example, an eNB or gNB), that sends and receives information to and from (for example, relays information between) vehicles 552, 554. The network communications through vehicle to network (V2N) links 558 and 510 may be used, for example, for long range communications between the vehicles 552, 554, such as for communicating the presence of a car accident a distance ahead along a road or highway. Other types of communications may be sent by the BS to the vehicles 552, 554, such as traffic flow conditions, road hazard warnings, environmental/weather reports, and service station availability, among other examples. Such data can be obtained from cloud-based sharing services.

In some circumstances, two or more subordinate entities (for example, UEs) may communicate with each other using sidelink signals. As described above, V2V and V2X communications are examples of communications that may be transmitted via a sidelink. Other applications of sidelink communications may include public safety or service announcement communications, communications for proximity services, communications for UE-to-network relaying, device-to-device (D2D) communications, peer-to-peer (P2P) communications, IoE communications, IoT communications, mission-critical mesh communications, among other suitable applications. Generally, a sidelink may refer to a direct link between one subordinate entity (for example, a UE1) and another subordinate entity (for example, a UE2). As such, a sidelink may be used to transmit and receive a communication (also referred to herein as a "sidelink signal") without relaying the communication through a scheduling entity (for example, a BS), even though a scheduling entity may be utilized for scheduling or control purposes. In some examples, a sidelink signal may be communicated using a licensed spectrum (unlike wireless local area networks, which typically use an unlicensed spectrum).

Various sidelink channels may be used for sidelink communications, including a physical sidelink discovery channel (PSDCH), a physical sidelink control channel (PSCCH), a physical sidelink shared channel (PSSCH), and a physical sidelink feedback channel (PSFCH). The PSDCH may carry discovery expressions that enable proximal devices to discover each other. The PSCCH may carry control signaling such as sidelink resource configurations and other parameters used for data transmissions. The PSSCH may carry the data transmissions.

For the operation regarding the PSSCH, a UE performs either transmission or reception in a slot on a carrier. New radio (NR) sidelink supports for a UE a case where all the symbols in a slot are available for sidelink, as well as another case where only a subset of consecutive symbols in a slot is available for sidelink.

The PSFCH may carry feedback such as CSI related to a sidelink channel quality. A sequence-based PSFCH format with one symbol (not including AGC training period) may be supported. The following formats may be possible: a PSFCH format based on PUCCH format 2 and a PSFCH format spanning all available symbols for sidelink in a slot.

Figure 6:
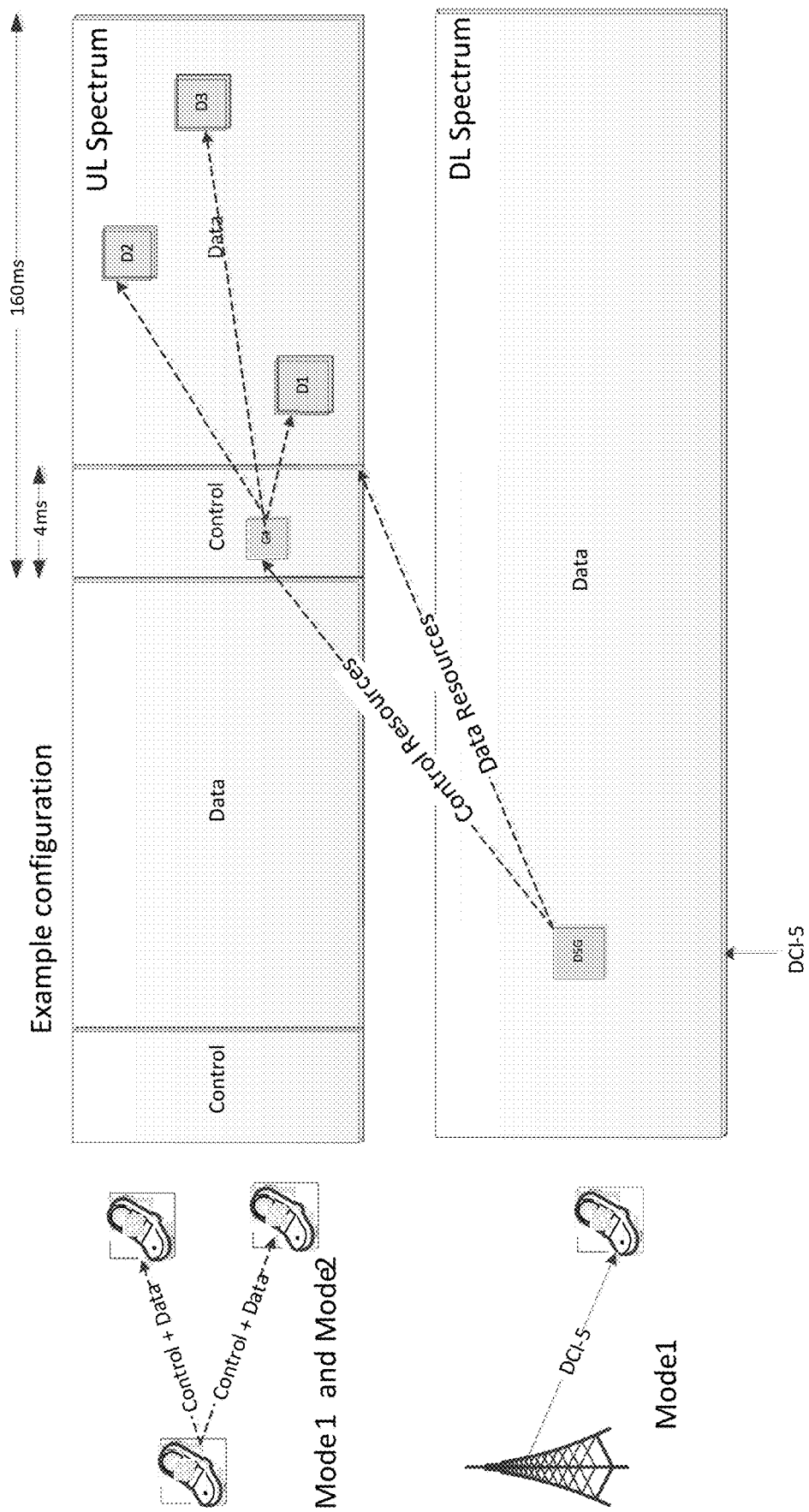
FIG. 6 illustrate example sidelink communications modes.

FIG. 6 provides an overview of sidelink communications (broadcast and groupcast device-to-device or D2D) between UEs. As noted above, with reference to FIGS. 5A and 5B, sidelink generally refers to the link between two UEs or user-relays that can be used in different scenarios and for different applications.

For example, for applications with in-coverage operation, both UEs are in a BS coverage, but directly communicate. This can be assumed for enabling some gaming applications. For applications with partial-coverage operation, one UE is in-coverage, and acts as a relay to extend the coverage for other UEs. For application with out-of-coverage operation, UEs are outside the BS coverage, but still need to communicate. This type of operation is important for mission critical applications, such as V2X and public safety.

As illustrated in FIG. 6, resource allocation for sidelink communications can be done in different ways. In a first mode, such as a Mode 1, the BS "schedules" the sidelink resources to be used by the UE for the sidelink transmission.

For a second mode, such as a Mode 2, the UE determines the sidelink resources (the BS does not schedule the sidelink transmission resources within sidelink resources configured by the BS). In this case, the UE autonomously selects the sidelink resources for transmission. A UE can assist in sidelink resource selection for other UEs. A UE may be configured with an NR configured grant for sidelink transmission and the UE may schedule sidelink transmissions for other UEs.

Example Sidelink DTX Configuration with Beam Refinement

User equipments (UEs) may communicate on different operating frequency ranges such as frequency range 1 (FR1) that includes sub-6 GHz frequency bands and FR2 that includes frequency bands from 24.25 GHz to 52.6 GHz. There are various challenges presented when the UEs are operating in the FR2.

Figure 7:
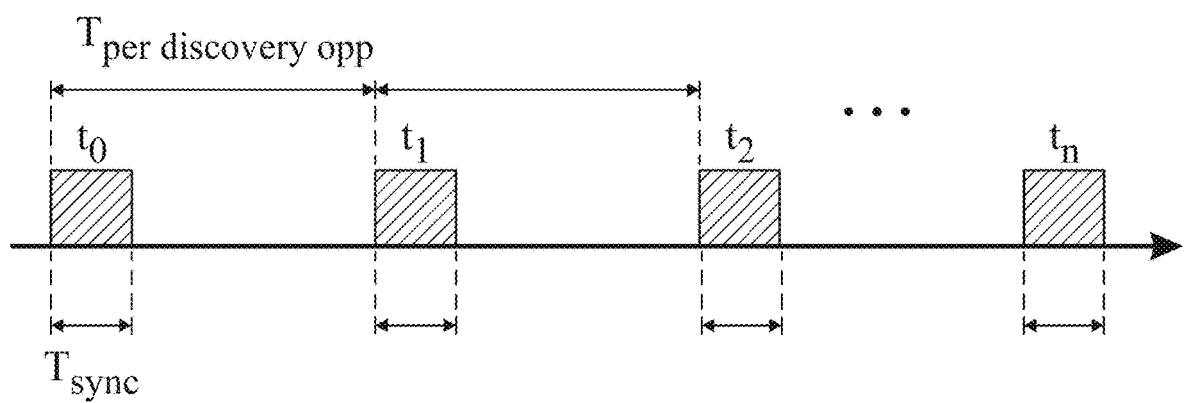
FIG. 7 illustrates an example of transmission discovery opportunity cycles, including transmission synchronization, in accordance with aspects of the present disclosure.

Sidelink communication (e.g. vehicle to everything (V2X)) over FR2 bands typically requires periodic beam discovery and beam alignment. FIG. 7 illustrates an example of periodic beam discovery opportunity (shown at $t_0$, $t_1$, $t_2$ . . . $t_n$) with a periodicity $T_{disc}^{per}$. Each occasion has a fixed duration, shown as $T_{synch}$, during which the UEs perform a beam sweep to determine possible beam pair links (BPLs). During these durations, the UEs may transmit synchronization signals and perform random access channel (RACH) procedures to establish, re-establish, or update connections. The UEs typically maintain a schedule to "listen" (receive) or "talk" (transmit) based on some algorithm.

The discovery periodicity $T_{disc}^{per}$ may be relatively large for sidelink communications (e.g., several hundred ms). The FR2 communication links may not be stable over this time. In some cases, a UE may be in a discontinuous reception (DRX) mode (when a UE only receives periodically) or a discontinuous transmission (DTX) mode (when a UE only transmits periodically) to conserve power. In DRX/DTX modes, the UEs may only monitor communication links intermittently, which may cause beam errors and misalignment, leading to low link robustness.

The FR2 communication links can be intermittent, especially with highly mobile UEs, as these links are easily blocked by common materials such as foliage, concrete, metals, and the like. Further, the FR2 communication links often require beam-formed access with narrow/pencil beams, which may go out of alignment relatively easily due to small relative motion between mobile UEs. Further, based on practical hardware constraints, the UEs can form at least one, and typically just a few beams at a time.

Moreover, communication devices operating over FR2 have higher power consumption than those operating over FR1. Hence, DTX and DRX modes may be used in an effort to limit power consumption by FR2 communication devices.

Since beam discovery periods can be far apart in time, as noted above, peer UEs may need to do a lengthy (e.g., exhaustive) beam search during beam discovery opportunities in order to select one or a few dominant beams to communicate over.

Figure 8A:
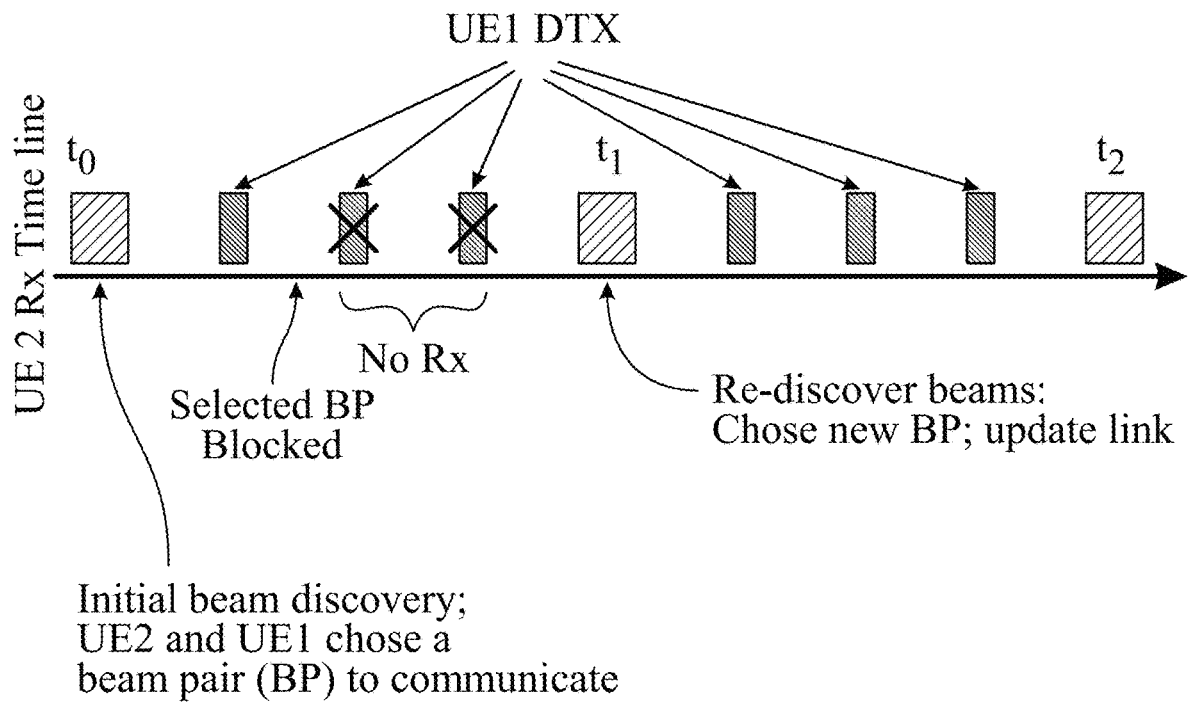
FIGS. 8A and 8B illustrate how discontinuous transmission (DTX) cycles may hamper beam pair (BP) discovery resulting, in beam mis-alignment.
Figure 8B:
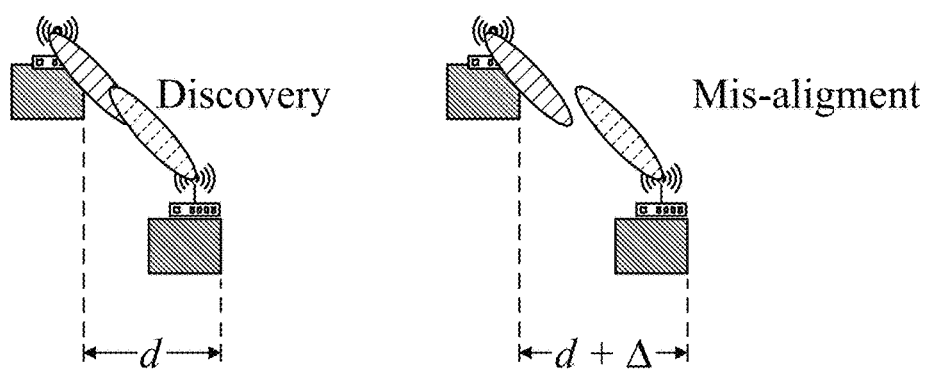

As illustrated in FIG. 8A, for a given DTX pattern, because the UEs only intermittently monitor links in DTX mode, communication links may be lost or become unusable. In FR2, this may happen due to a slight change in relative speed, a change in relative orientation (as shown in FIG. 8B), or a selected beam pair (BP) becoming blocked. In such cases, during the DTX on period, transmitting using same BP will lead to failure and the UE will need to wait until the next beam discovery period to re-discover beams and update the (BP) link. As a result, performance may suffer.

Aspects of the present disclosure, however, provide techniques that may be considered enhancements for DTX UEs operating using highly directional transmissions, such as V2X UEs in FR2.

According to certain aspects, certain DTX occasions may start with a short beam-refinement phase where a transmitter (Tx) UE sends sync/pilots over a subset of transmit beams identified during a previous beam discovery period. This may take much less time than an exhaustive search where all possible beams are used. A receiver (Rx) UE listens on a subset of beams based on the Tx beams (which may be indicated by the Tx UE). This phase may help quickly determine current dominant beam(s) and, in some cases, a beam refinement phase can be used to select narrower beams (increase beamforming gain) to increase link quality, and thus a communication rate. The depicted mechanism may lead to an increase in link robustness while still providing the power savings of the DTX-DRX procedure.

Figure 9:
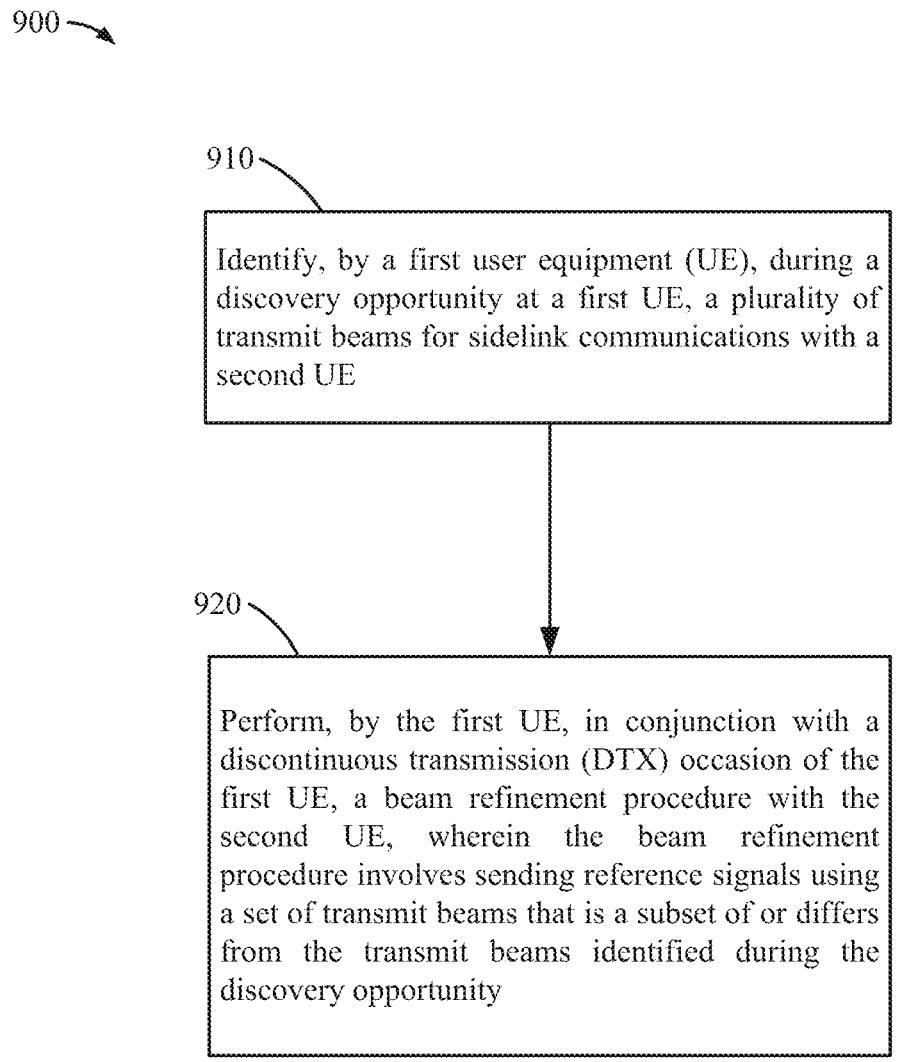
FIG. 9 illustrates example operations for beam refinement by a transmitter UE, according to certain aspects of the present disclosure.

FIG. 9 illustrates example operations 900 for wireless communications. For example, the operations 900 may be performed by a first UE (such as a Tx UE) (e.g., the UE 120a of FIG. 1 in the wireless communication network 100) to perform beam refinement during a DTX on period used for sidelink communication with another UE such as a second UE (e.g., the UE 120b of FIG. 1 in the wireless communication network 100). The operations 900 may be implemented as software components that are executed and run on one or more processors (e.g., the controller/processor 280 of FIG. 2). Further, the transmission and reception of signals by the first UE in the operations 900 may be enabled, for example, by one or more antennas (e.g., the antennas 252 of FIG. 2). In certain aspects, the transmission and/or reception of signals by the first UE may be implemented via a bus interface of one or more processors (e.g., the controller/processor 280) obtaining and/or outputting signals.

The operations 900 begin, at 910, by identifying, during a discovery opportunity, a plurality of transmit beams for sidelink communications with the second UE.

At 920, the first UE performs, in conjunction with a DTX occasion of the first UE, a beam refinement procedure with the second UE. The beam refinement procedure involves sending reference signals using a set of transmit beams that are a subset of or differ from the transmit beams identified during the discovery opportunity.

For example, the transmit beams used for the beam refinement procedure may be a subset of the transmit beams identified during the discovery opportunity or may be one or more narrower beams than the transmit beams identified during the discovery opportunity. In some cases, the (narrow/refined) transmit beams used for the beam refinement procedure may not be identified during the discovery procedure. For example, the first UE may send pilots on these beams, based on the spatial configuration. In some cases, a wider transmit beam (that may not have been used for discovery) may be split into several narrower transmit beams.

Figure 10:
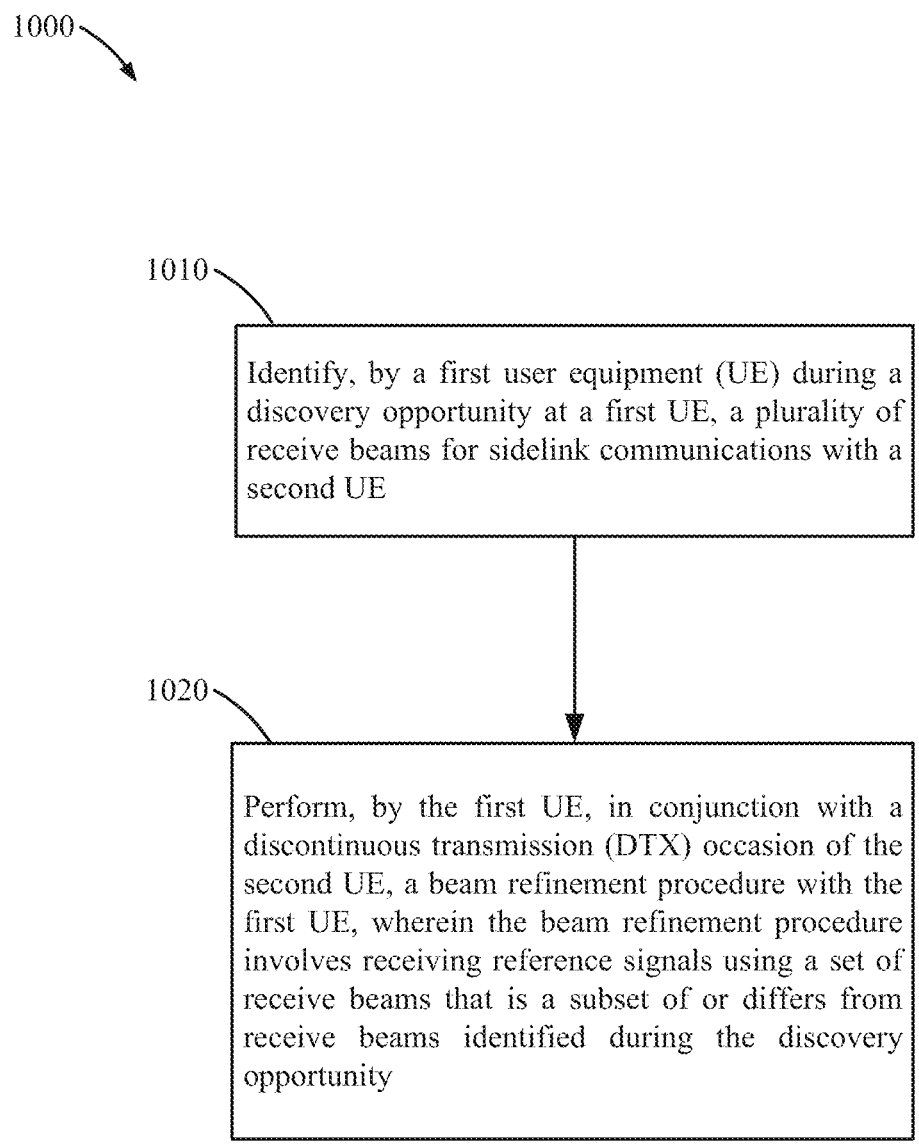
FIG. 10 illustrates example operations for beam refinement by a receiver UE, according to certain aspects of the present disclosure.

FIG. 10 illustrates example operations 1000 that may be considered complementary to operations 900 of FIG. 9. For example, the operations 1000 may be performed by a first UE (such as a Rx UE) (e.g., the UE 120a of FIG. 1 in the wireless communication network 100) to perform beam refinement during a DTX on period of a second UE (such as a Tx UE) (e.g., the UE 120b of FIG. 1 in the wireless communication network 100) performing operations 900 of FIG. 9. The operations 1000 may be implemented as software components that are executed and run on one or more processors (e.g., the controller/processor 280 of FIG. 2). Further, the transmission and reception of signals by the first UE in the operations 1000 may be enabled, for example, by one or more antennas (e.g., the antennas 252 of FIG. 2). In certain aspects, the transmission and/or reception of signals by the first UE may be implemented via a bus interface of one or more processors (e.g., the controller/processor 280) obtaining and/or outputting signals.

The operations 1000 begin, at 1010, by identifying, during a discovery opportunity at a first UE, a plurality of receive beams for sidelink communications with the second UE.

At 1020, the first UE performs, in conjunction with a DTX occasion of the second UE, the beam refinement procedure with the first UE. The beam refinement procedure involves receiving reference signals using a set of receive beams that are a subset of or differ from receive beams identified during the discovery opportunity.

Figure 11:
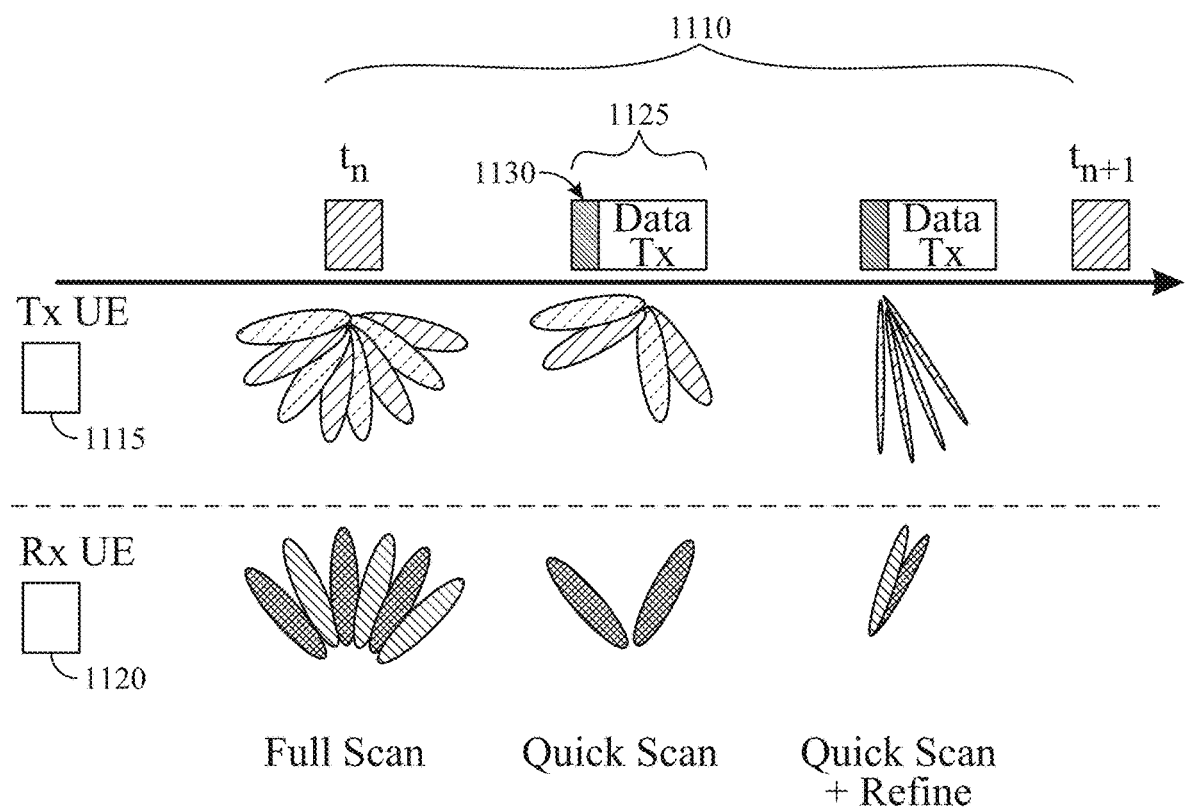
FIG. 11 illustrates an example beam refinement process per DTX occasion, according to certain aspects of the present disclosure.

For example, the receive beams used for the beam refinement procedure may be a subset of the receive beams identified during the discovery opportunity or may be narrower receive beams. As with the transmit beams, in some cases, the (narrow/refined) receive beams used for the beam refinement procedure may not be identified during the discovery procedure. For example, the first UE may split a wider receive beam (that may not have been used for discovery) into several narrower receive beams Operations of FIGS. 9 and 10 may be understood with reference to FIG. 11, which illustrates how a Tx UE 1115 and a Rx UE 1120 may perform a beam refinement procedure during DTX on periods. As illustrated, a full scan may be performed during a beam discovery period at $t_n$.

Between beam discovery opportunities ($t_n$ and $t_{n+1}$), each DTX occasion may start with a beam refinement procedure (at 1130). Performing the beam refinement procedure at the start of the DTX occasion may allow the results to be applied for subsequent data transmission (at 1125) during a remaining part of the DTX occasion. The beam refinement procedure could be performed at other times of a DTX occasion, for example, at or near the end (and the results applied in a subsequent DTX occasion).

As illustrated, the beam refinement procedure may involve a quick scan where the Tx UE 1115 sends synchronization signals/pilots over a subset of transmit beams while the Rx UE 1120 listens on a subset of receive beams. This is in contrast to an exhaustive search where all beams are used.

As illustrated in the second DTX occasion, the beam refinement procedure may be used to align narrower beams in a beam-set. In some cases, the beam refinement procedure may be used to align the narrower beams only after one or more dominant beams have been confirmed during consecutive beam refinement periods.

In some cases, DTX alignment (alignment of DTX on periods) can be performed based on spatial direction of links. In some cases, UEs may align their DTX cycles to accommodate transmission and reception time division multiplexing (TDM). For example, the Tx UE 1115 and the Rx UE 1120 may TDM their DTX cycles so that the Tx UE 1115 and the Rx UE 1120 are scheduled to transmit in different times. This may help increase communication link robustness and take care of movement/mis-alignment caused during OFF periods.

Although only DTX occasion 1125 is discussed above, and only two shown in FIG. 11, there may be any number of these periods between two successive discovery opportunities 1110. Additionally, although both quick scan and beam narrowing are discussed together, one or more refinement procedure may include a quick scan, beam narrowing, or both, within a given refinement procedure.

Figure 12:
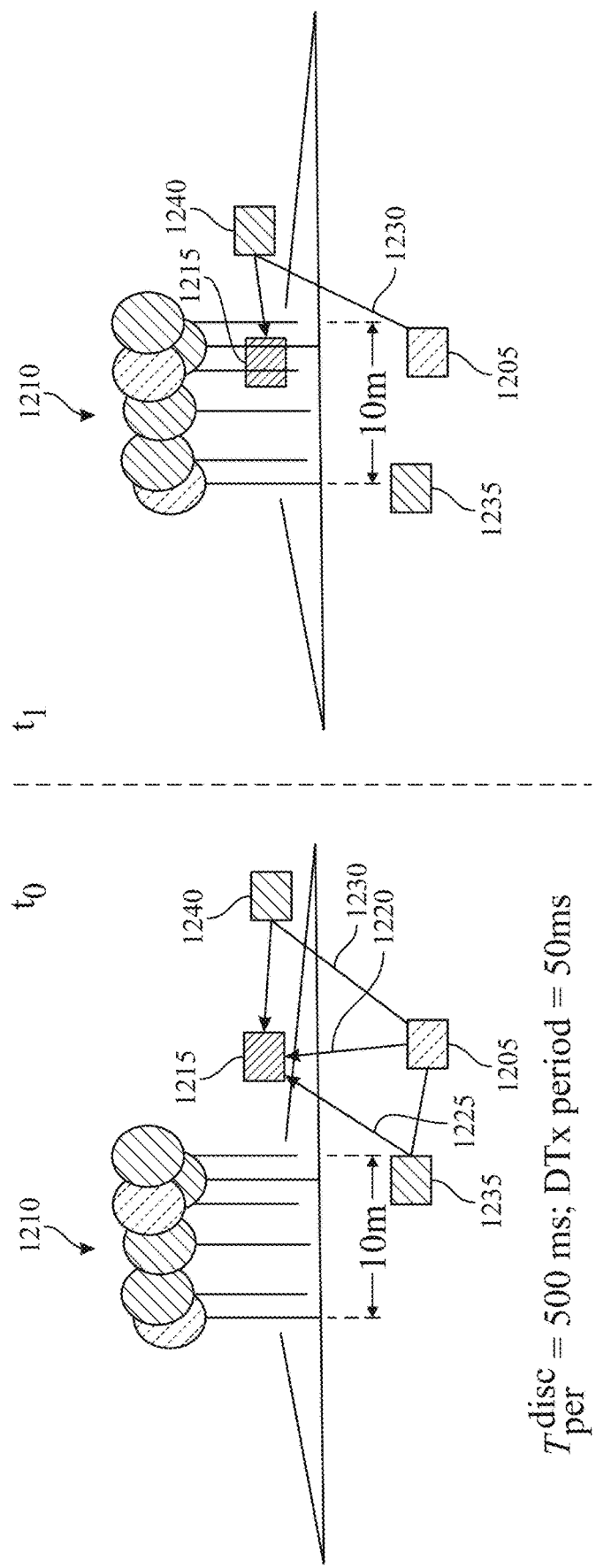
FIG. 12 depicts an example scenario for deploying beam refinement, according to certain aspects of the present disclosure.

FIG. 12 depicts an example 1200 scenario for deploying beam refinement according to disclosed embodiments. The example 1200 assumes a first UE 1205 has undergone a discovery opportunity with a second UE 1215 and has identified a set of BPLs, including a first BPL 1220 (direct line of sight), a second BPL 1225 (communication through a third UE 1235), and a third BPL 1230 (communication through a fourth UE 1240. For successful communication, UEs 1205 and 1215 choose BPL 1220 for communications at to.

At $t_1$, corresponding to a DTX occasion, the first UE 1205 is obscured from the second UE 1215 by an obstacle 1210 (a 10 m width of foliage). Due to the speed of the first UE 1205, it will take 300 ms to traverse the obstacle 1210, potentially blocking communications for 6 50 ms DTX occasions, until the next discovery opportunity, potentially preventing communications during this traversal time. According to disclosed embodiments, rather wait for the next discovery opportunity, a beam refinement procedure may be performed at a start of the DTX occasion, on a subset of the identified BPLs. As a result of this beam refinement procedure, the third BPL 1230 may be identified as suitable for communications (since the first BPL 1220 and the second BPL 1225 are obstructed by the foliage). Thus, for a remainder of the DTX occasion, the third BPL 1230 may be used, thus enabling at least some communications.

Figure 13:
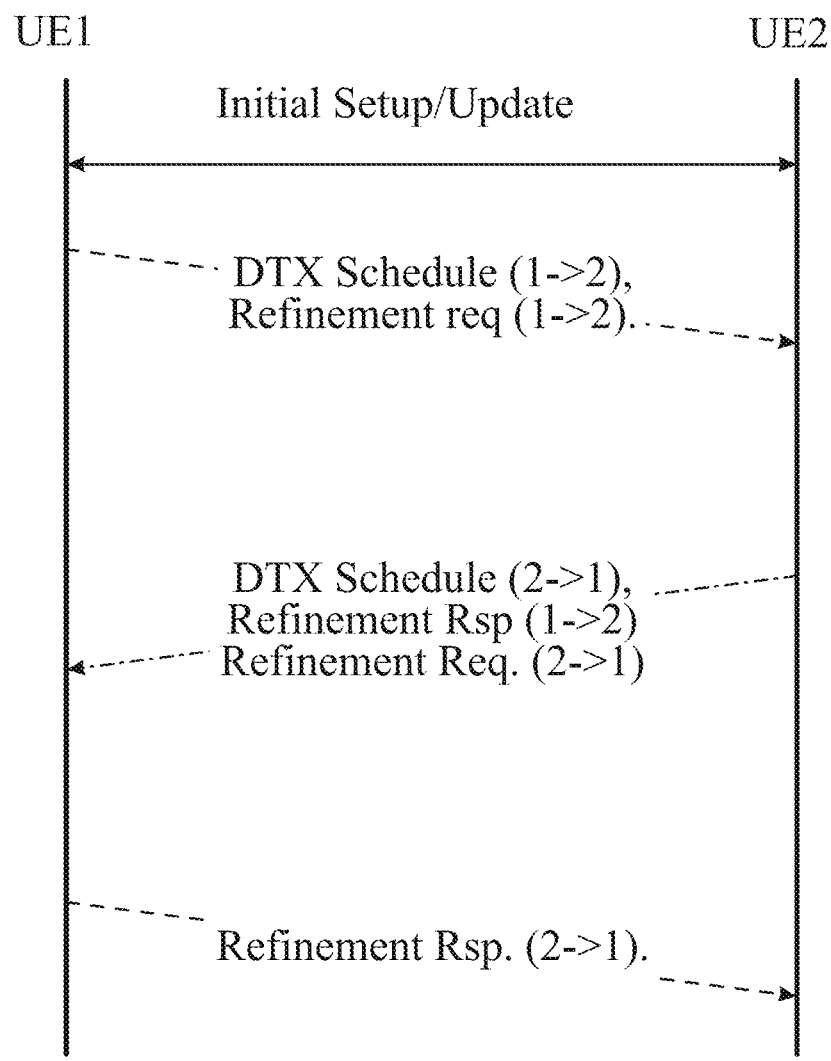
FIG. 13 is a call flow diagram illustrating an example beam refinement procedure between two UEs, according to certain aspects of the present disclosure.

FIG. 13 illustrates an example beam refinement procedure call-flow diagram 1300 according to embodiments of the present disclosure.

During an initial connection set-up/update, for example, similar to a discovery opportunity discussed above, a Tx UE (such as UE1) may identify a set of transmit beams for communicating with an Rx UE (such as UE2). As illustrated, UE1 may indicate its DTX schedule to UE2. UE1 may also indicate (e.g., in a beam refinement request) a subset of beams to use for beam refinement (e.g., by Tx beam ID). For example, UE1 may identify that 3 beams are to be used and may identify their quasi co-location (QCL) relationship. The DTX schedule may indicate a fixed time duration at the beginning of a DTX period for refinement. UE2 may also provide its DTX schedule, send a response to the beam refinement request from UE1, and send its own request for beam refinement (to which UE1 may respond).

In some cases, UE2 may indicate whether UE2 is capable of performing the beam sense/refinement during a DTX occasion. If UE2 is capable, UE2 may indicate (in the beam refinement response) the number of Rx beams UE2 sweeps for each of the Tx beams. In some cases, UE2 may reject the beam refinement request, for example, due to one of hardware capability, conflict with higher priority Tx or Rx, or to avoid an increase in wake time.

In some cases, after the set-up phase is completed, the peer UEs exchange an RRC connection update message indicating the beam pairs to be used in the current DTX occasion.

In some cases, if UE2 determines that one (or possibly a few, in embodiments where multi-beam is possible), beam is dominant (e.g., based on reference signal received power for one or more successive DTX occasions), UE2 may take various actions. For example, UE2 may continue with a current beam refinement procedure indicated in the DTX information. In some cases, UE2 may request UE1 to refine (narrow) beams in the next DTX occasion to increase link quality. In another case, UE2 may indicate to UE1 that one or more identified beam pairs are stable and request turning off of the beam refinement procedure for a number of DTX occasions (e.g., to increase the OFF period, especially when already transmitting at a high modulation and coding scheme). In another case, UE2 may indicate to UE1 to reduce the refinement procedure to occur less often (e.g., perform the refinement procedure one time for every three DTX occasions).

On the other hand, UE2 may also take one or more actions if UE2 identifies that some beam pairs have deteriorated considerably (and some are still useable). In one case, UE2 may use the best possible BP in the set. In another case, UE2 may request (e.g., via RRC messaging) that UE1 to transmit the reference signal in other possible directions (similar to the "full scan" mentioned above). In such a case, UE1 may reject the request (e.g., due to lack of resources, time constraints, priority Tx/Rx transmissions) or may accept the request and send the Tx beam configurations. In the latter case, UE2 may send UE1 an indication of the Rx beams it will use to scan for the Tx reference signal. In some case, UE1 may continue to transmit data over deteriorated beam pairs if new beam pairs are not found, and if/once a new BP is found with better quality, UE1 and UE2 may exchange RRC connection updates.

In some cases, resources allocated for beam refinement (sensing during the discovery opportunity or during the refinement procedure) are not fixed. In one embodiment, UE1 may need to reserve resource to transmit refinement pilots/sequences. In some cases, UE may indicate via sidelink control information (SCI) that these resources are being reserved for beam sensing/refinement. In some cases, UE2 may allocate the same resources for different Tx UEs for sensing and refinement. In some cases, such resources may be allocated by a third node (e.g., gNB, RSU, sync UE, etc.) and not the UEs themselves. In some cases, the signaling indicating such resource allocation may be made on FR1, while the beam refinement is performed on FR2.

In some cases, if sufficient resources are not available for carrying out a beam refinement procedure, UE1 may send an indication that refinement resources are not available. In such cases, transmission may be done on a previously agreed upon beam pair(s).

In some cases, each transmission time interval (e.g., frame/subframe) may have some fixed refinement resources (e.g., semi-static/static case). For example, the first 4 subframes of every $10^{th}$ frame may have frequency resources (e.g., a band or within a band) reserved for beam refinement. In some cases, the availability of such resources may be indicated by a gNB, by a sync UE, or may be pre-configured.

Figure 14:
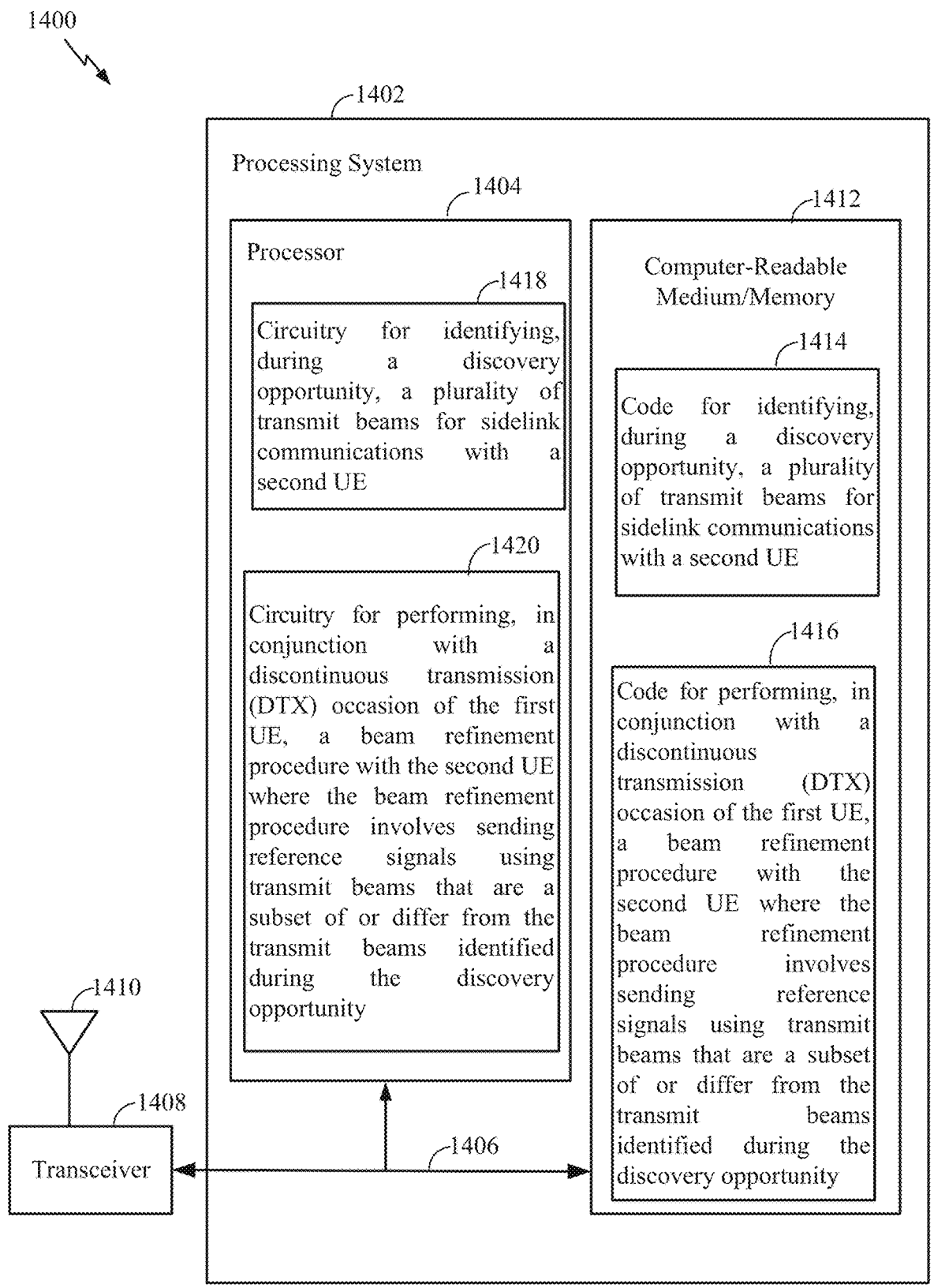
FIG. 14 illustrates a communications device that may include various components configured to perform operations for techniques disclosed herein, in accordance with certain aspects of the present disclosure.

FIG. 14 illustrates a communications device 1400 that may include various components (e.g., corresponding to means-plus-function components) configured to perform operations for the techniques disclosed herein, such as the operations illustrated in FIG. 9. The communications device 1400 includes a processing system 1402 coupled to a transceiver 1408 (e.g., a transmitter and/or a receiver). The transceiver 1408 is configured to transmit and receive signals for the communications device 1400 via an antenna 1410, such as the various signals as described herein. The processing system 1402 is configured to perform processing functions for the communications device 1400, including processing signals received and/or to be transmitted by the communications device 1400.

The processing system 1402 includes a processor 1404 coupled to a computer-readable medium/memory 1412 via a bus 1406. In certain aspects, the computer-readable medium/memory 1412 is configured to store instructions (e.g., a computer-executable code) that when executed by the processor 1404, cause the processor 1404 to perform the operations illustrated in FIG. 9, or other operations for performing the various techniques discussed herein. In certain aspects, computer-readable medium/memory 1412 stores code 1414 for identifying and code 1416 for performing. The code 1414 for identifying may include code for identifying, during a discovery opportunity, a plurality of transmit beams for sidelink communications with a second UE. The code 1416 for performing may include code for performing, in conjunction with a DTX occasion of the first UE, a beam refinement procedure with the second UE, wherein the beam refinement procedure involves sending reference signals using transmit beams that are a subset of or differ from the transmit beams identified during the discovery opportunity.

The processor 1404 may include circuitry configured to implement the code stored in the computer-readable medium/memory 1412, such as for performing the operations illustrated in FIG. 9, as well as other operations for performing the various techniques discussed herein. For example, the processor 1404 includes circuitry 1418 for identifying and circuitry 1420 for performing. The circuitry 1418 for identifying may include circuitry for identifying, during a discovery opportunity, a plurality of transmit beams for sidelink communications with a second UE. The circuitry 1420 for performing may include circuitry for performing, in conjunction with a DTX occasion of the first UE, a beam refinement procedure with the second UE, wherein the beam refinement procedure involves sending reference signals using transmit beams that are a subset of or differ from the transmit beams identified during the discovery opportunity.

Figure 15:
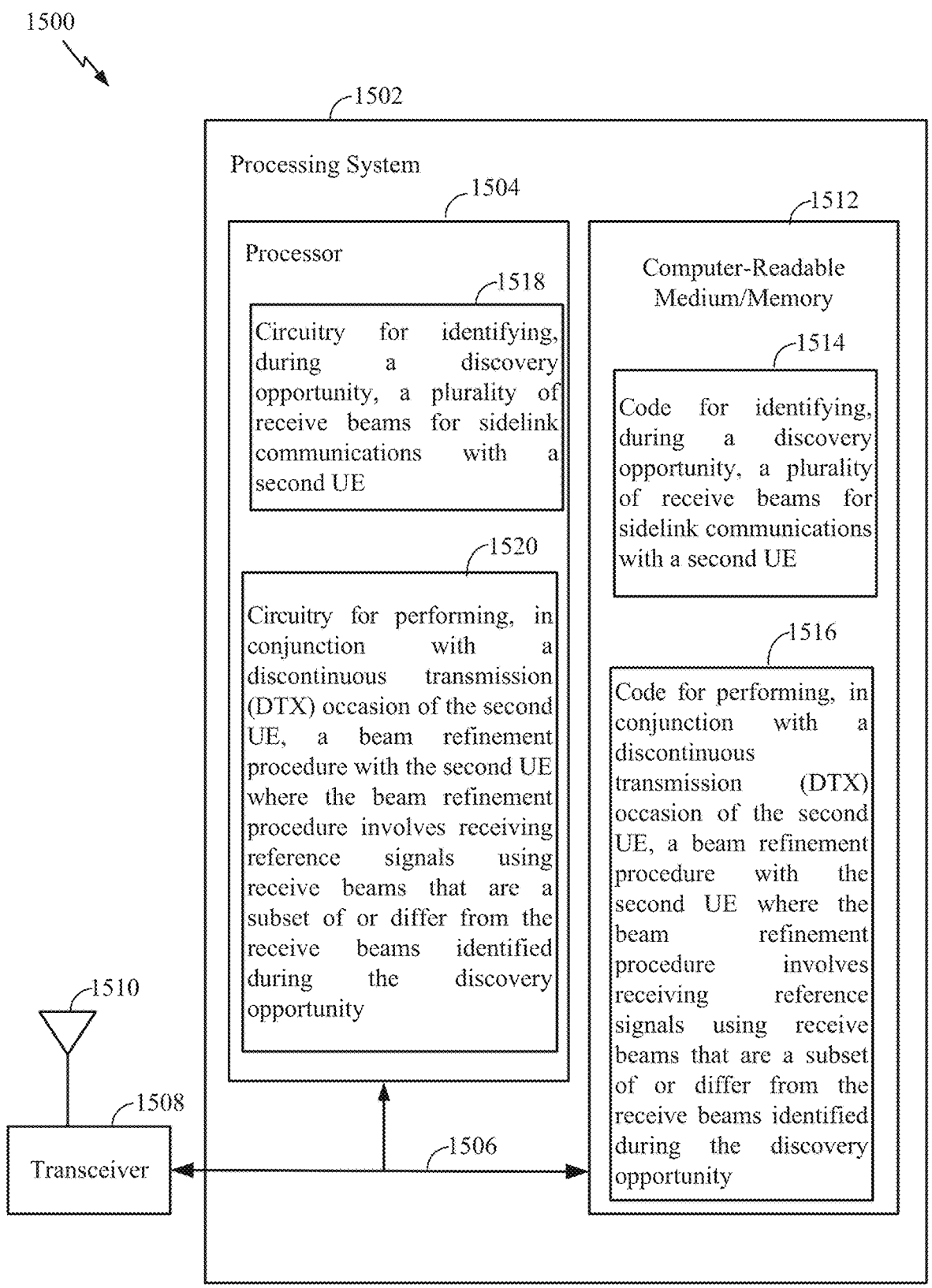
FIG. 15 illustrates a communications device that may include various components configured to perform operations for techniques disclosed herein, in accordance with certain aspects of the present disclosure.

FIG. 15 illustrates a communications device 1500 that may include various components (e.g., corresponding to means-plus-function components) configured to perform operations for the techniques disclosed herein, such as the operations illustrated in FIG. 10. The communications device 1500 includes a processing system 1502 coupled to a transceiver 1508 (e.g., a transmitter and/or a receiver). The transceiver 1508 is configured to transmit and receive signals for the communications device 1500 via an antenna 1510, such as the various signals as described herein. The processing system 1502 is configured to perform processing functions for the communications device 1500, including processing signals received and/or to be transmitted by the communications device 1500.

The processing system 1502 includes a processor 1504 coupled to a computer-readable medium/memory 1512 via a bus 1506. In certain aspects, the computer-readable medium/memory 1512 is configured to store instructions (e.g., a computer-executable code) that when executed by the processor 1504, cause the processor 1504 to perform the operations illustrated in FIG. 10, or other operations for performing the various techniques discussed herein. In certain aspects, computer-readable medium/memory 1512 stores code 1514 for identifying and code 1516 for performing. The code 1514 for identifying may include code for identifying, during a discovery opportunity, a plurality of receive beams for sidelink communications with a second UE. The code 1516 for performing may include code for performing, in conjunction with a DTX occasion of the second UE, a beam refinement procedure with the second UE, wherein the beam refinement procedure involves receiving reference signals using receive beams that are a subset of or differ from the receive beams identified during the discovery opportunity.

The processor 1504 may include circuitry configured to implement the code stored in the computer-readable medium/memory 1512, such as for performing the operations illustrated in FIG. 10, as well as other operations for performing the various techniques discussed herein. For example, the processor 1504 includes circuitry 1518 for identifying and circuitry 1520 for performing. The circuitry 1518 for identifying may include circuitry for identifying, during a discovery opportunity, a plurality of receive beams for sidelink communications with a second UE. The circuitry 1520 for performing may include circuitry for performing, in conjunction with a DTX occasion of the second UE, a beam refinement procedure with the second UE, wherein the beam refinement procedure involves receiving reference signals using receive beams that are a subset of or differ from the receive beams identified during the discovery opportunity.

EXAMPLE ASPECTS

Implementation examples are described in the following numbered aspects.

In a first aspect, a method for wireless communications by a first user equipment (UE), comprising: identifying, during a discovery opportunity, a plurality of transmit beams for sidelink communications with a second UE; and performing, in conjunction with a discontinuous transmission (DTX) occasion of the first UE, a beam refinement procedure with the second UE, wherein the beam refinement procedure involves sending reference signals using transmit beams that are a subset of or differ from the transmit beams identified during the discovery opportunity.

In a second aspect, alone or in combination with the first aspect, the beam refinement procedure is performed at a start of the DTX occasion.

In a third aspect, alone or in combination with one or more of the first and second aspects, aligning DTX occasions based on results of the beam refinement procedure or to accommodate the beam refinement procedure.

In a fourth aspect, alone or in combination with one or more of the first through third aspects, signaling the second UE an indication of the subset of transmit beams for the beam refinement procedure.

In a fifth aspect, alone or in combination with one or more of the first through fourth aspects, receiving, from the second UE, an indication the second UE is capable of performing the beam refinement procedure.

In a sixth aspect, alone or in combination with one or more of the first through fifth aspects, the indication includes a number of receive beams the second UE is to sweep for each of the transmit beams used in the beam refinement procedure.

In a seventh aspect, alone or in combination with one or more of the first through sixth aspects, sending a request to the second UE to perform the beam refinement procedure; and performing the beam refinement procedure only if the second UE accepts the request.

In an eighth aspect, alone or in combination with one or more of the first through seventh aspects, after performing the beam refinement procedure, exchanging information with the second UE regarding one or more beam pair to be used in a current or subsequent DTX occasion.

In a ninth aspect, alone or in combination with one or more of the first through eighth aspects, taking one or more actions if feedback from the second UE indicates one or more of the subset of transmit beams are dominant.

In a tenth aspect, alone or in combination with one or more of the first through ninth aspects, the one or more actions comprise using narrow beams during a beam refinement procedure for a subsequent DTX occasion.

In an eleventh aspect, alone or in combination with one or more of the first through tenth aspects, the feedback comprises a request from the second UE to refine the transmit beams used in the beam refinement procedure in a subsequent DTX occasion; and the one or more actions comprise refining the transmit beams per the request.

In a twelfth aspect, alone or in combination with one or more of the first through eleventh aspects, the feedback comprises a request from the second UE to at least temporarily stop performing the beam refinement procedure in one or more subsequent DTX occasions; and the one or more actions comprise at least temporarily stopping performing the beam refinement procedure per the request.

In a thirteenth aspect, alone or in combination with one or more of the first through twelfth aspects, the feedback comprises a request from the second UE to perform the beam refinement procedure less frequently; and the one or more actions comprise performing the beam refinement procedure less frequently per the request.

In a fourteenth aspect, alone or in combination with one or more of the first through thirteenth aspects, taking one or more actions if feedback from the second UE indicates one or more of the subset of transmit beams has deteriorated.

In a fifteenth aspect, alone or in combination with one or more of the first through fourteenth aspects, the feedback indicates at least one of the subset of transmit beams is still usable; and the one or more actions comprise using a beam pair involving the usable beam for one or successive DTX occasions.

In a sixteenth aspect, alone or in combination with one or more of the first through fifteenth aspects, the feedback comprises a request for the first UE to send reference signals in different directions using transmit beams other than the subset of transmit beams; and the one or more actions comprise sending the reference signals per the request.

In a seventeenth aspect, alone or in combination with one or more of the first through sixteenth aspects, sending the second UE information regarding the other transmit beams used to send the reference signals.

In an eighteenth aspect, alone or in combination with one or more of the first through seventeenth aspects, receiving feedback indicating one or more of the other beams was suitable; and exchanging information with the second UE regarding one or more beam pairs with one of the suitable beams to be used in a current or subsequent DTX occasion.

In a nineteenth aspect, alone or in combination with one or more of the first through eighteenth aspects, indicating, to the second UE, resources allocated for the beam refinement procedure.

In a twentieth aspect, alone or in combination with one or more of the first through nineteenth aspects, receiving, from another entity, an indication of resources allocated for the beam refinement procedure.

In a twenty-first aspect, alone or in combination with one or more of the first through twentieth aspects, beam refinement is performed in a first frequency range; and resources allocated for the beam refinement procedure are signaled via a second frequency range.

In a twenty-second aspect, alone or in combination with one or more of the first through twenty-first aspects, signaling the second UE an indication that sufficient resources are not available for the beam refinement procedure; and transmitting, during a DTX occasion, using a previously agreed beam pair.

In a twenty-third aspect, alone or in combination with one or more of the first through twenty-second aspects, fixed resources are allocated for the beam refinement procedure for a set of transmission time intervals (TTIs).

In a twenty-fourth aspect, alone or in combination with one or more of the first through twenty-third aspects, sending a request to one or more other UEs to adjust their DTX occasions to accommodate beam refinement procedures.

In a twenty-fifth aspect, alone or in combination with one or more of the first through twenty-fourth aspects, the request is sent via an offset alignment message that contains at least one of a time offset or updated common measurement period.

In a twenty-sixth aspect, alone or in combination with one or more of the first through twenty-fifth aspects, limiting the number of beam refinement procedures performed by at least one of: refraining from indicating a beam refinement period of the first UE to one or more other UEs; or sending at least one other UE a message to disable beam refinement periods for DTX occasions.

In a twenty-seventh aspect, a method for wireless communications by a first user equipment (UE), comprising: identifying, during a discovery opportunity, a plurality of receive beams for sidelink communications with a second UE; and performing, in conjunction with a discontinuous transmission (DTX) occasion of the second UE, a beam refinement procedure with the second UE, wherein the beam refinement procedure involves receiving reference signals using receive beams that are a subset of or differ from the receive beams identified during the discovery opportunity.

In a twenty-eighth aspect, alone or in combination with the twenty-seventh aspect, the beam refinement procedure is performed at a start of the DTX occasion.

In a twenty-ninth aspect, alone or in combination with one or more of the twenty-seventh and twenty-eighth aspects, receiving, from the second UE, an indication of the subset of transmit beams for the beam refinement procedure.

In a thirtieth aspect, alone or in combination with one or more of the twenty-seventh through twenty-ninth aspects, sending, to the second UE, an indication the first UE is capable of performing the beam refinement procedure.

In a thirty-first aspect, alone or in combination with one or more of the twenty-seventh through thirtieth aspects, the indication includes a number of receive beams the first UE is to sweep for each of the transmit beams used in the beam refinement procedure.

In a thirty-second aspect, alone or in combination with one or more of the twenty-seventh through thirty-first aspects, receiving a request from the second UE to perform the beam refinement procedure; and performing the beam refinement procedure only after sending a response to accept the request.

In a thirty-third aspect, alone or in combination with one or more of the twenty-seventh through thirty-second aspects, after performing the beam refinement procedure, exchanging information with the second UE regarding one or more beam pair to be used in a current or subsequent DTX occasion.

In a thirty-fourth aspect, alone or in combination with one or more of the twenty-seventh through thirty-third aspects, providing feedback to the second UE that indicates one or more of the subset of transmit beams are dominant.

In a thirty-fifth aspect, alone or in combination with one or more of the twenty-seventh through thirty-fourth aspects, using narrow beams during a beam refinement procedure for a subsequent DTX occasion.

In a thirty-sixth aspect, alone or in combination with one or more of the twenty-seventh through thirty-fifth aspects, the feedback comprises a request to refine the transmit beams used in the beam refinement procedure in a subsequent DTX occasion.

In a thirty-seventh aspect, alone or in combination with one or more of the twenty-seventh through thirty-sixth aspects, the feedback comprises a request to at least temporarily stop performing the beam refinement procedure in one or more subsequent DTX occasions.

In a thirty-eighth aspect, alone or in combination with one or more of the twenty-seventh through thirty-seventh aspects, the feedback comprises a request to perform the beam refinement procedure less frequently.

In a thirty-ninth aspect, alone or in combination with one or more of the twenty-seventh through thirty-ninth aspects, providing the second UE feedback that indicates one or more of the subset of transmit beams has deteriorated.

In a fortieth aspect, alone or in combination with one or more of the twenty-seventh through thirty-ninth aspects, the feedback indicates at least one of the subset of transmit beams is still usable; and the beam refinement procedure is performed using a beam pair involving the usable beam for one or successive DTX occasions.

In a forty-first aspect, alone or in combination with one or more of the twenty-seventh through fortieth aspects, the feedback comprises a request for the first UE to send reference signals in different directions than a subset of transmit beams previously used for a beam refinement procedure.

In a forty-second aspect, alone or in combination with one or more of the twenty-seventh through forty-first aspects, receiving, from the second UE, information regarding the other transmit beams used to send the reference signals.

In a forty-third aspect, alone or in combination with one or more of the twenty-seventh through forty-second aspects, sending feedback, to the second UE, indicating one or more of the other beams was suitable; and exchanging information with the second UE regarding one or more beam pairs with one of the suitable beams to be used in a current or subsequent DTX occasion.

In a forty-fourth aspect, alone or in combination with one or more of the twenty-seventh through forty-third aspects, receiving, from the second UE, an indication of resources allocated for the beam refinement procedure.

In a forty-fifth aspect, alone or in combination with one or more of the twenty-seventh through forty-fourth aspects, receiving, from another entity, an indication of resources allocated for the beam refinement procedure.

In a forty-sixth aspect, alone or in combination with one or more of the twenty-seventh through forty-fifth aspects, the beam refinement is performed in a first frequency range; and resources allocated for the beam refinement procedure are signaled via a second frequency range.

In a forty-seventh aspect, alone or in combination with one or more of the twenty-seventh through forty-sixth aspects, receiving, from the second UE, signaling of an indication that sufficient resources are not available for the beam refinement procedure; and receiving, during a DTX occasion, using a previously agreed beam pair.

In a forty-eighth aspect, alone or in combination with one or more of the twenty-seventh through forty-seventh aspects, fixed resources are allocated for the beam refinement procedure for a set of transmission time intervals (TTIs).

In a forty-ninth aspect, alone or in combination with one or more of the twenty-seventh through forty-eighth aspects, sending a request to one or more other UEs to adjust their DTX occasions to accommodate beam refinement procedures.

In a fiftieth aspect, alone or in combination with one or more of the twenty-seventh through forty-ninth aspects, the request is sent via an offset alignment message that contains at least one of a time offset or updated common measurement period.

In a fifty-first aspect, alone or in combination with one or more of the twenty-seventh through fiftieth aspects, limiting the number of beam refinement procedures performed by at least one of: refraining from indicating a beam refinement period of the first UE to one or more other UEs; or sending at least one other UE a message to disable beam refinement periods for DTX occasions.

An apparatus for wireless communication, comprising at least one processor; and a memory coupled to the at least one processor, the memory comprising code executable by the at least one processor to cause the apparatus to perform the method of any of the first through fifty-first aspects.

An apparatus comprising means for performing the method of any of the first through fifty-first aspects.

A computer readable medium storing computer executable code thereon for wireless communications that, when executed by at least one processor, cause an apparatus to perform the method of any of the first through fifty-first aspects.

ADDITIONAL CONSIDERATIONS

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 9 and 10.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communications by a first user equipment (UE), comprising:

identifying, during a beam discovery period, a plurality of transmit beams for sidelink communications with a second UE; and performing, in conjunction with a discontinuous transmission (DTX) occasion of the first UE, a beam refinement procedure with the second UE, wherein the beam refinement procedure involves sending reference signals using transmit beams that are a subset of or differ from the plurality of transmit beams identified during the beam discovery period, wherein the beam refinement procedure is performed at a start of the DTX occasion.

2. The method of claim 1, further comprising aligning DTX occasions based on results of the beam refinement procedure or to accommodate the beam refinement procedure.

3. The method of claim 1, further comprising signaling the second UE an indication of the subset of transmit beams for the beam refinement procedure.

4. The method of claim 1, further comprising receiving, from the second UE, an indication that the second UE is capable of performing the beam refinement procedure, wherein the indication includes a number of receive beams the second UE is to sweep for each of the transmit beams used in the beam refinement procedure.

5. The method of claim 1, further comprising:
sending a request to the second UE to perform the beam refinement procedure; and
performing the beam refinement procedure only if the second UE accepts the request.

6. The method of claim 1, further comprising:
after performing the beam refinement procedure, exchanging information with the second UE regarding one or more beam pairs to be used in a current or subsequent DTX occasion.

7. The method of claim 1, further comprising taking one or more actions if a feedback from the second UE indicates that one or more of the subset of transmit beams are dominant, wherein at least one of:
the one or more actions comprise using narrow beams during a beam refinement procedure for a subsequent DTX occasion;
the feedback comprises a request from the second UE to refine the transmit beams used in the beam refinement procedure in a subsequent DTX occasion and the one or more actions comprise refining the transmit beams per the request;
the feedback comprises the request from the second UE to at least temporarily stop performing the beam refinement procedure in one or more subsequent DTX occasions and the one or more actions comprise at least temporarily stopping performing the beam refinement procedure per the request; or
the feedback comprises the request from the second UE to perform the beam refinement procedure less frequently and the one or more actions comprise performing the beam refinement procedure less frequently per the request.

8. The method of claim 1, further comprising taking one or more actions if a feedback from the second UE indicates that one or more of the subset of transmit beams has deteriorated, wherein at least one of:
the feedback indicates at least one of the subset of transmit beams is still usable and the one or more actions comprise using a beam pair involving the usable beam for one or successive DTX occasions; or
the feedback comprises a request for the first UE to send reference signals in different directions using transmit beams other than the subset of transmit beams and the one or more actions comprise sending the reference signals per the request.

9. The method of claim 8, further comprising:
sending, the second UE, information regarding the other transmit beams used to send the reference signals;
receiving feedback indicating one or more of the other beams was suitable; and
exchanging information with the second UE regarding one or more beam pairs with one of the suitable beams to be used in a current or subsequent DTX occasion.

10. The method of claim 1, further comprising indicating, to the second UE, resources allocated for the beam refinement procedure, wherein the beam refinement procedure is performed in a first frequency range and the resources allocated for the beam refinement procedure are signaled via a second frequency range, and wherein the resources allocated are fixed resources for a set of transmission time intervals (TTIs).

11. The method of claim 1, further comprising receiving, from another entity, an indication of resources allocated for the beam refinement procedure, wherein the resources allocated are fixed resources for a set of transmission time intervals (TTIs).

12. The method of claim 1, further comprising:
signaling the second UE an indication that sufficient resources are not available for the beam refinement procedure; and
transmitting, during a DTX occasion, using a previously agreed beam pair.

13. The method of claim 1, further comprising sending a request to one or more other UEs to adjust their DTX occasions to accommodate beam refinement procedures, and wherein the request is sent via an offset alignment message that contains at least one of a time offset or updated common measurement period.

14. The method of claim 1, further comprising limiting a number of beam refinement procedures performed by at least one of:
refraining from indicating a beam refinement period of the first UE to one or more other UEs; or
sending at least one other UE a message to disable beam refinement periods for DTX occasions.

15. A method for wireless communications by a first user equipment (UE), comprising:
identifying, during a beam discovery period, a plurality of receive beams for sidelink communications with a second UE; and
performing, in conjunction with a discontinuous transmission (DTX) occasion of the second UE, a beam refinement procedure with the second UE, wherein the beam refinement procedure involves receiving reference signals using receive beams that are a subset of or differ from the plurality of receive beams identified during the beam discovery period, wherein the beam refinement procedure is performed at a start of the DTX occasion.

16. The method of claim 15, further comprising receiving, from the second UE, an indication of a subset of transmit beams for the beam refinement procedure.

17. The method of claim 15, further comprising sending, to the second UE, an indication that the first UE is capable of performing the beam refinement procedure, wherein the indication includes a number of receive beams the first UE is to sweep for each of transmit beams used in the beam refinement procedure.

18. The method of claim 15, further comprising:
receiving a request from the second UE to perform the beam refinement procedure; and
performing the beam refinement procedure only after sending a response to accept the request.

19. The method of claim 15, further comprising:
after performing the beam refinement procedure, exchanging information with the second UE regarding one or more beam pairs to be used in a current or subsequent DTX occasion.

20. The method of claim 15, further comprising providing a feedback to the second UE that indicates that one or more of a subset of transmit beams are dominant and using narrow beams during the beam refinement procedure for a subsequent DTX occasion; wherein the feedback comprises at least one of:
a request to refine the transmit beams used in the beam refinement procedure in a subsequent DTX occasion;
the request to at least temporarily stop performing the beam refinement procedure in one or more subsequent DTX occasions; or
the request to perform the beam refinement procedure less frequently.

21. The method of claim 15, further comprising providing the second UE, a feedback that indicates one or more of a subset of transmit beams has deteriorated and at least one of the subset of transmit beams is still usable, wherein the beam refinement procedure is performed using a beam pair involving the usable beam for one or successive DTX occasions.

22. The method of claim 21, wherein the feedback comprises a request for the first UE to send reference signals in different directions than a subset of transmit beams previously used for a beam refinement procedure.

23. The method of claim 22, further comprising:
receiving, from the second UE, information regarding other transmit beams used to send the reference signals;
sending feedback, to the second UE, indicating one or more of the other beams was suitable; and
exchanging information with the second UE regarding one or more beam pairs with one of the suitable beams to be used in a current or subsequent DTX occasion.

24. The method of claim 15, further comprising receiving, from the second UE, an indication of resources allocated for the beam refinement procedure, wherein the beam refinement is performed in a first frequency range and the resources allocated for the beam refinement procedure are signaled via a second frequency range, and wherein the resources allocated are fixed resources for a set of transmission time intervals (TTIs).

25. The method of claim 15, further comprising:
receiving, from the second UE, signaling of an indication that sufficient resources are not available for the beam refinement procedure; and
receiving, during a DTX occasion, using a previously agreed beam pair.

26. The method of claim 15, further comprising sending a request to one or more other UEs to adjust their DTX occasions to accommodate beam refinement procedures, wherein the request is sent via an offset alignment message that contains at least one of a time offset or updated common measurement period.

27. The method of claim 15, further comprising limiting a number of beam refinement procedures performed by at least one of:
refraining from indicating a beam refinement period of the first UE to one or more other UEs; or
sending at least one other UE a message to disable beam refinement periods for DTX occasions.

28. An apparatus for wireless communications by a first user equipment (UE), comprising:
at least one processor and a memory configured to
identify, during a beam discovery period, a plurality of transmit beams for sidelink communications with a second UE; and
perform, in conjunction with a discontinuous transmission (DTX) occasion of the first UE, a beam refinement procedure at a start of the DTX occasion with the second UE, wherein the beam refinement procedure involves sending reference signals using transmit beams that are a subset of or differ from the plurality of transmit beams identified during the beam discovery period.

29. An apparatus for wireless communications by a first user equipment (UE), comprising:
at least one processor and a memory configured to
identify, during a beam discovery period, a plurality of receive beams for sidelink communications with a second UE; and
perform, in conjunction with a discontinuous transmission (DTX) occasion of the second UE, a beam refinement procedure at a start of the DTX occasion with the second UE, wherein the beam refinement procedure involves receiving reference signals using receive beams that are a subset of or differ from the plurality of receive beams identified during the beam discovery period.

* * * * *